US007519780B2

(12) United States Patent
DeMent et al.

(10) Patent No.: US 7,519,780 B2
(45) Date of Patent: Apr. 14, 2009

(54) SYSTEM AND METHOD FOR REDUCING STORE LATENCY IN SYMMETRICAL MULTIPROCESSOR SYSTEMS

(75) Inventors: Jonathan J. DeMent, Austin, TX (US); Roy M. Kim, Austin, TX (US); Alvan W. Ng, Austin, TX (US); Kevin C. Stelzer, Austin, TX (US); Thuong Q. Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 11/556,346

(22) Filed: Nov. 3, 2006

(65) Prior Publication Data

US 2008/0109585 A1 May 8, 2008

(51) Int. Cl.
*G06F 12/00* (2006.01)
(52) U.S. Cl. .................................................. 711/151
(58) Field of Classification Search ..................... None
See application file for complete search history.

(56) References Cited

U.S. PATENT DOCUMENTS

| 4,760,521 | A | | 7/1988 | Rehwald et al. |
| 5,581,713 | A | | 12/1996 | Myers et al. |
| 5,659,708 | A | | 8/1997 | Arimilli et al. |
| 5,734,926 | A | | 3/1998 | Feeley et al. |
| 5,781,757 | A | | 7/1998 | Deshpande |
| 5,878,268 | A | * | 3/1999 | Hagersten ..................... 712/28 |
| 6,085,295 | A | * | 7/2000 | Ekanadham et al. ......... 711/145 |
| 6,226,718 | B1 | * | 5/2001 | Carpenter et al. ............ 711/152 |
| 6,247,100 | B1 | | 6/2001 | Drehmel et al. |
| 6,275,907 | B1 | * | 8/2001 | Baumgartner et al. ....... 711/143 |
| 6,351,791 | B1 | | 2/2002 | Freerksen et al. |
| 6,460,133 | B1 | | 10/2002 | Nunez et al. |
| 6,513,084 | B1 | | 1/2003 | Berkowitz et al. |
| 6,640,289 | B2 | * | 10/2003 | McCrory et al. ............. 711/144 |
| 7,177,987 | B2 | * | 2/2007 | Van Doren et al. .......... 711/146 |

(Continued)

OTHER PUBLICATIONS

Hammond et al., "Programming with Transactional Coherence and Consistency (TCC)", ACM, Proceeding of the 11th International Conference on Architectural Support for Programming Languages and Operating Systems, Boston, Massachussets, Oct. 7-13, 2004, pp. 1-13.

(Continued)

*Primary Examiner*—Hiep T Nguyen
(74) *Attorney, Agent, or Firm*—Stephen J. Walder, Jr.; Matthew B. Talpis

(57) ABSTRACT

A system and method for reducing store latency in symmetrical multiprocessor systems are provided. Bus agents are provided which monitor reflected ownership requests (Dclaims) to determine if the reflected Dclaim is its own Dclaim. If so, the bus agent determines that it is the winner of the ownership request and can immediately perform data modification using its associated local cache. If the bus agent determines that the reflected Dclaim does not match its own Dclaim, it determines that it is the loser of the ownership request and invalidates the corresponding cache line in its own local cache. The loser bus agent may then send a Read With Intent to Modify request to obtain the data from another cache and place it into its own cache for modification. These operations are performed without the need for a Kill request and without having to perform retries of a losing ownership request.

35 Claims, 17 Drawing Sheets

U.S. PATENT DOCUMENTS

| | | |
|---|---|---|
| 2002/0129211 A1 | 9/2002 | Arimilli et al. |
| 2003/0093657 A1 | 5/2003 | Mayfield |
| 2003/0131202 A1 | 7/2003 | Khare et al. |
| 2004/0236887 A1* | 11/2004 | Kim et al. .................. 710/110 |
| 2005/0160239 A1 | 7/2005 | Johns |
| 2006/0253661 A1 | 11/2006 | Bass et al. |
| 2006/0253662 A1 | 11/2006 | Bass et al. |

OTHER PUBLICATIONS

U.S. Appl. No. 11/121,121, filed May 3, 2005, Bass et al.
U.S. Appl. No. 11/120,909, filed May 3, 2005, Bass et al.

* cited by examiner

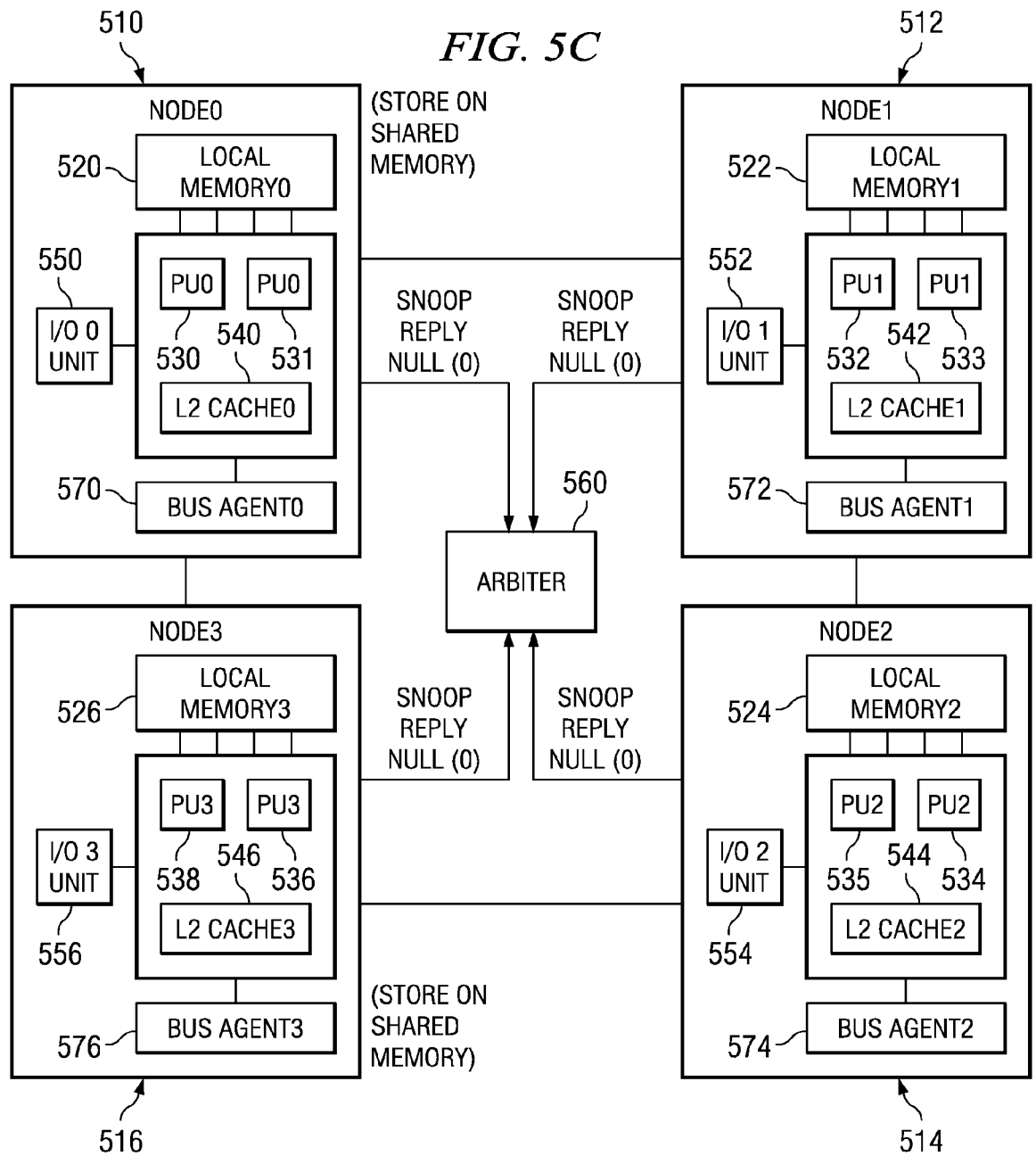

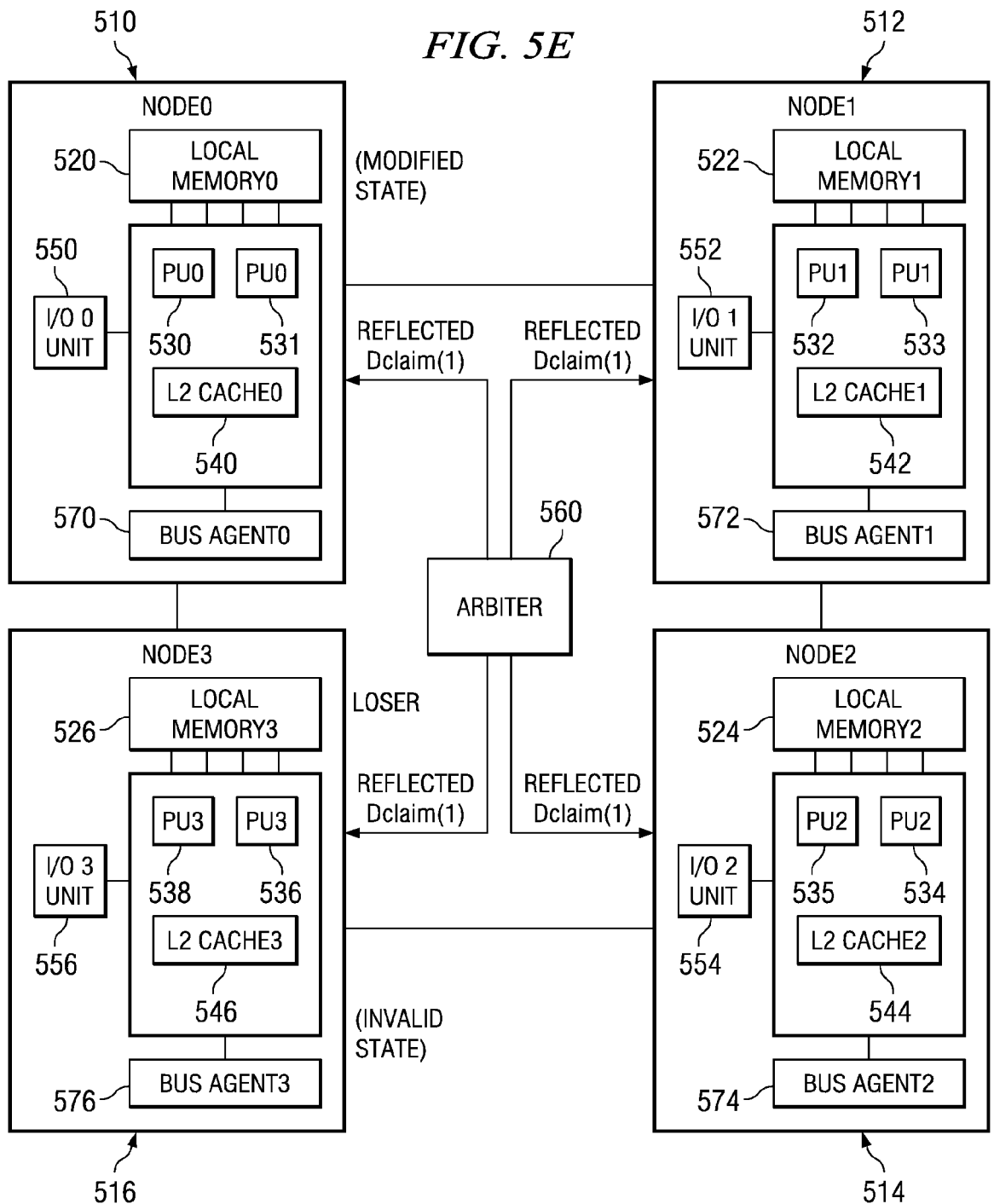

SYSTEM AND METHOD FOR REDUCING STORE LATENCY IN SYMMETRICAL MULTIPROCESSOR SYSTEMS

BACKGROUND

1. Technical Field

The present application relates generally to an improved data processing system and method. More specifically, the present application is directed to a system and method for reducing store latency in symmetrical multiprocessor systems.

2. Description of Related Art

In symmetrical multiprocessing (SMP) systems, there are three basic components: the processing units with their cache, input/output (I/O) devices with their direct memory access (DMA) engines, and a distributed system memory. The processing units execute instructions while the I/O devices handle the physical transmission of data to and from memory using their DMA engines. The processing units also control the I/O devices by issuing commands from an instruction stream. The distributed system memory stores data for use by these other components.

As technology advances, SMP systems use a greater number of processing units and have increased system memory sizes. As a result, the modern SMP system utilizes a plurality of separate integrated circuit (IC) chips to provide these resources. These separate IC chips need to be able to communicate with each other in order to transfer data between all the components in the SMP system. Moreover, in order to keep the processing units' caches coherent, each IC chip in the SMP system needs to be able to see each command issued by processing units of each of the other IC chips.

The processing units' caches keep copies of data from system memory in order to allow the processing unit fast access to the data. A coherent architecture allows caches to have shared copies of data. Alternatively, the coherent architecture allows caches to have exclusive copies of data so that the corresponding processing unit can update the data. With exclusive copies of data, the data in the processing unit's cache is the most up to date version of the data since that processing unit is the only one permitted to modify the data. In order to keep each of the processing units' caches valid, each command in the SMP system has to be seen by each IC chip so that out of date copies of data can be invalidated and not used for future processing. Eventually, the modified copy of data in a processor's cache will be written back to system memory and the entire process can start over again.

In order to simplify the design of the various components, all commands are sent to an arbiter which makes sure that no two commands to the same address are permitted to be active and access that address at the same time. If the architecture allowed two commands to the same address to be active in the SMP system, the various components of the SMP system would have to keep track of each address they had acknowledged and compare it against the new address to see if they were already in the middle of a transfer for that address. If the component was in the middle of a transfer, the second command would need to be retried so that it can complete after the current transfer is completed. Moreover, if two or more processing units were attempting to obtain exclusive access to a cache line, the processing units may "fight" for ownership, thereby reducing system performance. By having the arbiter ensure that no two commands to the same address are active at the same time, the logic needed in each system component is reduced.

FIG. 1 is an exemplary diagram illustrating a known architecture in which the arbiter is provided as a separate IC chip in the SMP system. As shown in FIG. 1, the SMP system 100 includes four IC chips 110, 112, 114, and 116. Each IC chip 110-116 contains one or more processing units (PUs) 120-127, a corresponding L2 cache 130-136, a local memory 140-144, and an input/output (I/O) unit 150-156. In this architecture, a separate IC chip 160 is provided which performs the arbiter operations. This separate IC chip 160 is connected to each of the four IC chips 110-116 using unique data wires.

Command information flows between the arbiter IC chip 160 and the IC chips 110-116 as shown in FIG. 1 diagrammatically. That is, each individual IC chip 110-116 may individually communicate directly with the arbiter IC chip 160. Moreover, each IC chip 110-116 communicates with its two neighboring IC chips in a ring fashion. For example, IC chip 110 may send commands/data to IC chip 112, IC chip 112 may send commands/data to IC chip 114, IC chip 114 may send commands/data to IC chip 116, and IC chip 116 may send commands/data to IC chip 110.

When a new command is issued by a PU of an IC chip 110-116, the IC chip 110-116 will forward the command to the arbiter IC chip 160 which performs arbitration functions for the SMP system 100. When the arbiter IC chip 160 determines it is time for the command to be sent, it forwards the command to each IC chip 110-116 which in turn each forward the command to their internal PUs. Each PU responds to the command to indicate it has seen the command and to inform the arbiter IC chip 160 as to whether it is too busy to process the command and it should be retried, whether the PU has ownership of the portion of data corresponding to the command and the command must be retried, or whether the command is okay to go forward. These responses, i.e. partial responses, are sent back to the arbiter IC chip 160. The arbiter IC chip 160 then combines the partial responses and builds a combined response that is sent to each of the four IC chips 110-116. Once each PU on each IC chip 110-116 has seen the combined response and the combined response is determined to be "good" (i.e. not retried), the data may be moved to the cache of the destination IC chip 110-116. In addition, the IC chip of the PU issuing the command, and all cache states of the IC chips 110-116 may be updated.

One problem in these multiple node SMP systems is that a first node may need data that is stored in a second node's memory or cache and the first node may not have any idea where the necessary data is located. Therefore, there must be a method of communication between the nodes in the SMP system. The arbiter controls the communication between the nodes in this manner.

FIG. 2 is an exemplary diagram illustrating a conventional example of a cache miss or direct memory access (DMA) operation through a four node SMP system, such as that shown in FIG. 1 above, in accordance with a known architecture. As shown in FIG. 2, in order to modify data content within a cache line of one of the local caches 230-236 of one of the nodes 210-216, a cache controller of a node 210-216 needs to first get ownership of the cache line before the data modification can occur. The requirement to obtain ownership of the cache line is a technique for ensuring that only one process may manipulate data in a cache line at one time. As a result, the integrity of the data in the shared cache is maintained.

Typically, there are five steps, or command phases, to modify data in a "shared" cache line, i.e. a cache line that stores data that is currently located in more than one local cache in the SMP system. These five steps or command phases will now be described in detail.

The first phase is an initial ownership request (referred to as a "Dclaim") which results from a cache hit to a "shared" cache line in the requesting node, for example. The Dclaim is sent to the bus arbiter 260, which handles the system bus operations. The Dclaim is sent with a transaction tag which is a unique code identifying the transaction.

The second phase is a reflected command, wherein the arbiter broadcasts the request to bus agents (not shown) of all nodes 210-216 in the SMP system. The reflected command is produced by the bus arbiter 260 and includes the transaction tag of the Dclaim.

The third phase involves the bus agents 270-276 of the nodes 210-216 "snooping" the reflected command, checking their associated local caches 230-236 and system memories 240-246 for the requested data, and providing a snoop reply with the requestor's transaction tag. The snoop replies specify the results of searching the caches 230-236 and system memory 240-246 of the nodes 210-216.

The fourth phase involves the bus arbiter 260 receiving the snoop replies, also referred to herein as partial responses, from the nodes 210-216 in the SMP system and generating a combined result of all the snoop replies. The bus arbiter 260 combines all the snoop replies from the bus agents 270-276 and broadcasts a combined response back to all of the bus agents 270-276 with the requestor's transaction tag. This combined response informs the nodes 210-216 how to proceed with the original ownership request.

The fifth phase is the data transfer phase. The node with the data, e.g., node1 212, is able to send the data to the requesting node, e.g., node0 210, using information from the original reflected command and the combined response.

For example, assume that node0 210 has a store command which hits a "shared" cache line in the cache 230 of node0 210. In accordance with the known architecture and methodology, node0 210 sends an initial ownership request (1), i.e. a Dclaim, to the bus arbiter 260 with the memory address range of the requested data and a transaction tag. The bus arbiter 260 sends out a reflected command (2) to the nodes 210-216. Each of nodes 210-216 then snoop (search) their caches 230-236 and system memory 240-246 for the requested data corresponding to the requested memory address range.

After the nodes 210-216 have snooped their caches 230-236 and system memory 240-246, they send out a snoop reply (3). In the depicted example, node0 210 may send a snoop reply (3) that indicates a null response because it is the requesting node and does not have the requested data, as determined by the requested address range. Likewise, node1 212 may send a snoop reply (3) that indicates a null response because it also does not have the requested data.

Node2 214 is busy and cannot snoop its cache 234. Thus, node2 214 sends a snoop reply (3) with a retry being identified, e.g., through setting a retry bit, meaning that the original ownership request needs to be resent at a later time.

Node3 216 has the accurate, updated data and sends a snoop reply (3) with intervention identified, such as by setting an intervention bit. The intervention bit signifies that node3 216 has the most up-to-date data for the requested address range. Node3 216 may know whether or not it has the most up-to-date data for the requested address range based on a setting of a cache state identifier that indicates the status of the data. The cache state identifier may indicate whether the data is modified, invalid, exclusive, etc.

The bus arbiter 260 collects the snoop relies (3) from all of the nodes 210-216. The arbiter 260 sees that a retry bit has been set and orders a combined response of "retry" (4), which indicates that this request must start over because one node 214 was busy and unable to snoop its cache 234. When node0 210 sees a "retry" combined response (4), it sends its original ownership request out to the bus again and the process starts over.

Inefficiencies are present in the known architecture due to processing multiple ownership requests for the same shared cache line. The arbiter operates to resolve multiple requests for the same cache line (which may or may not be multiple requests for the same address range since the address ranges specified are typically less than the entire size of a cache line) such that only one ownership request becomes the "winner" and the other ownership requests become "losers" that must be retried, i.e. the ownership request must be reissued by the requesting node. The "winner" sends out another request, i.e. a Kill request, to remove the validity of the cache line in the other caches of the other nodes, which starts from the first phase mentioned above. This Kill request needs to be honored, by operation of the second through fourth phases discussed above, before the data modification may be performed.

The "losers" will keep repeating the first through fourth phases discussed above, reissuing the ownership request until the winner's Kill request is completed and all other cache lines are invalid. The losers will then change the ownership request type to a "Read With Intent To Modify" (RWITM) which starts again from the first phase and proceeds through to the fifth phase.

These operations associated with the Kill request take a considerable amount of time to get resolved, especially in large symmetrical multiprocessor systems. As a result, these operations affect the overall system performance. Thus, it would be beneficial to have a protocol that can more efficiently resolve multiple requests to modify shared data in a multiprocessor system.

SUMMARY

A system and method for reducing store latency in symmetrical multiprocessor systems are provided. Bus agents are provided which monitor reflected ownership requests to determine if the reflected ownership request is its own ownership request. If so, the bus agent determines that it is the winner of the ownership request and can immediately perform data modification using its associated local cache. If the bus agent determines that the reflected ownership request does not match its own ownership request, it determines that it is the loser of the ownership request and invalidates the corresponding cache line in its own local cache. The loser bus agent may then send a "Read With Intent to Modify" (RWITM) request in order to obtain the data from the current cache line owner and in turn modify it. These operations are performed without the need for a Kill request and without having to perform retries of a losing ownership request.

In one illustrative embodiment, a method, in a multiprocessor system, for controlling access to a portion of data is provided. The method may comprise sending a request for ownership of a portion of a shared memory to an arbiter, receiving a reflected request for ownership from the arbiter, and determining if ownership of the portion of shared memory will be granted by the arbiter based on the received reflected request. The method may further comprise preparing, prior to receiving ownership of the portion of shared memory, to access the portion of shared memory in response to determining that the ownership of the portion of shared memory will be granted by the arbiter. Moreover, the method may comprise accessing the portion of shared memory in response to receiving ownership of the portion of shared memory from the arbiter.

Accessing the portion of shared memory may comprise sending a reply to the reflected request for ownership to the arbiter, and receiving a combined response from the arbiter, the combined response being a combination of all replies to the reflected request for ownership received by the arbiter from all processor nodes in the multiprocessor system. Accessing the portion of shared memory may further comprise accessing the portion of shared memory in response to receiving the combined response.

The shared memory may be a shared cache. Each processor node of the multiprocessor system may have a local memory and local cache. A combination of the local caches may constitute a shared cache. The arbiter may be a single centralized arbiter.

The arbiter may be a single arbiter provided in one processor node in the multiprocessor system. The arbiter may comprise a plurality of arbitration logic units with each arbitration logic unit being provided in a processor node within the multiprocessor system.

The request for ownership may have an associated transaction tag. Determining if ownership of the portion of shared memory will be granted by the arbiter based on the received reflected request may comprise determining if a transaction tag provided in the reflected request for ownership matches a transaction tag of the request for ownership.

The method may be performed by a first processing node of the multiprocessor system. A second request for ownership of the portion of shared memory may be received by the arbiter from a second processor node of the multiprocessor system and, in response to the second processor node receiving the reflected request for ownership, the second processor node may wait, without retrying the second request for ownership, for reflection of the second request for ownership if the reflected request for ownership does not match the second request for ownership.

The method may further comprise preparing to submit a "request with intent to modify" (RWITM) request to the arbiter once the arbiter reflects the request for ownership, if ownership of the portion of shared memory will not be granted by the arbiter. If ownership of the portion of shared memory will not be granted by the arbiter, the request for ownership may be not retried prior to sending the RWITM request to the arbiter. Moreover, the method may comprise submitting the RWITM request to the arbiter, receiving a reflected RWITM request from the arbiter, and replying to the reflected RWITM request by sending a reply to the arbiter. The method may also comprise receiving a combined response from the arbiter, receiving a data transfer from a processor node having an up to date version of the portion of shared memory, and modifying a state of the portion of shared memory in response to receiving the data transfer. If the arbiter grants ownership of the portion of shared memory, a Kill request is not sent to remove the validity of the portion of shared memory in other processor nodes of the multiprocessor system.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a plurality of processor nodes and an arbiter coupled to the plurality of processor nodes. A first processor node in the plurality of processor nodes may send a request for ownership of a portion of a shared memory to the arbiter, receive a reflected request for ownership from the arbiter, and determine if ownership of the portion of shared memory will be granted by the arbiter based on the received reflected request. The first processor node may further prepare, prior to receiving ownership of the portion of shared memory, to access the portion of shared memory in response to determining that the ownership of the portion of shared memory will be granted by the arbiter and may access the portion of shared memory in response to receiving ownership of the portion of shared memory from the arbiter.

The first processor node may accesses the portion of shared memory by sending a reply to the reflected request for ownership to the arbiter and receiving a combined response from the arbiter, the combined response being a combination of all replies to the reflected request for ownership received by the arbiter from all of the processor nodes in the plurality of processor nodes. The first process node may access the portion of shared memory in response to receiving the combined response.

The shared memory may be a shared cache and each processor node in the plurality of processor nodes may have a local memory and local cache. A combination of the local caches may constitute the shared cache.

The arbiter may be a single centralized arbiter that may be provided in one processor node in the plurality of processor nodes. Alternatively, the arbiter may comprise a plurality of arbitration logic units, each arbitration logic unit being provided in a processor node within the plurality of processor nodes.

The request for ownership may have an associated transaction tag. The first processor node may determine if ownership of the portion of shared memory will be granted by the arbiter based on the received reflected request by determining if a transaction tag provided in the reflected request for ownership matches a transaction tag of the request for ownership.

A second request for ownership of the portion of shared memory may be received by the arbiter from a second processor node of the plurality of processor nodes and, in response to the second processor node receiving the reflected request for ownership, the second processor node may wait, without retrying the second request for ownership, for reflection of the second request for ownership if the reflected request for ownership does not match the second request for ownership.

The first processor node may prepare to submit a "request with intent to modify" (RWITM) request to the arbiter once the arbiter reflects the request for ownership, if ownership of the portion of shared memory will not be granted by the arbiter. If ownership of the portion of shared memory will not be granted by the arbiter, the request for ownership may not be retried prior to sending the RWITM request to the arbiter. If the arbiter grants ownership of the portion of shared memory, a Kill request may not be sent to remove the validity of the portion of shared memory in other processor nodes of the multiprocessor system.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A-5K are exemplary diagrams illustrating a protocol and operation of intelligent bus agents and arbitration logic when handling multiple ownership requests for a same shared cache line;

DETAILED DESCRIPTION OF THE ILLUSTRATIVE EMBODIMENTS

Figure 3:
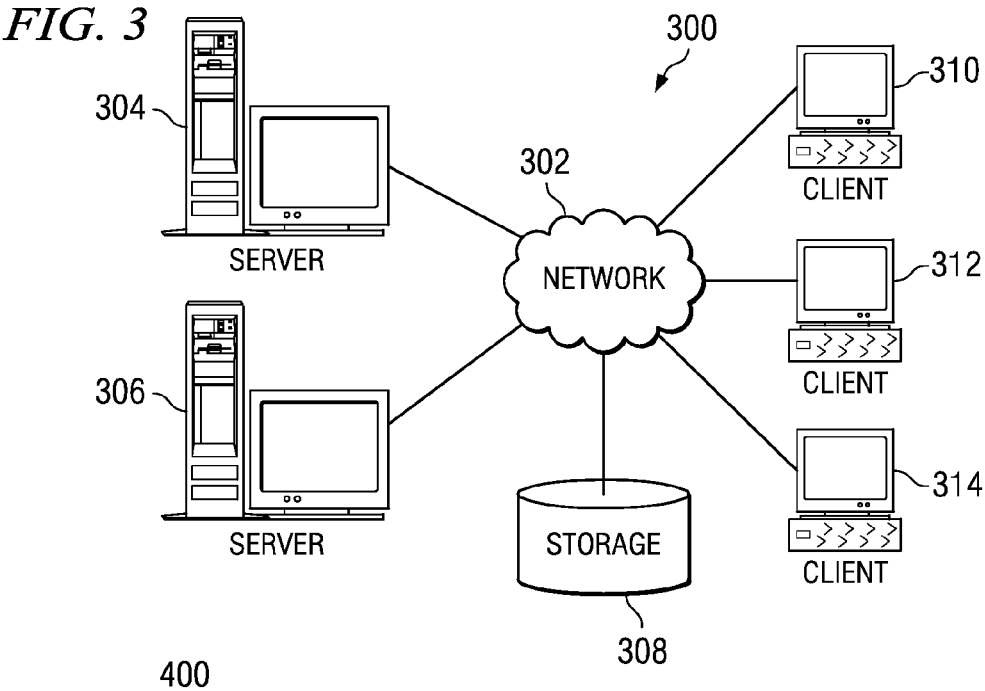
FIG. 3 depicts a pictorial representation of an exemplary distributed data processing system in which aspects of the illustrative embodiments may be implemented.
Figure 4:
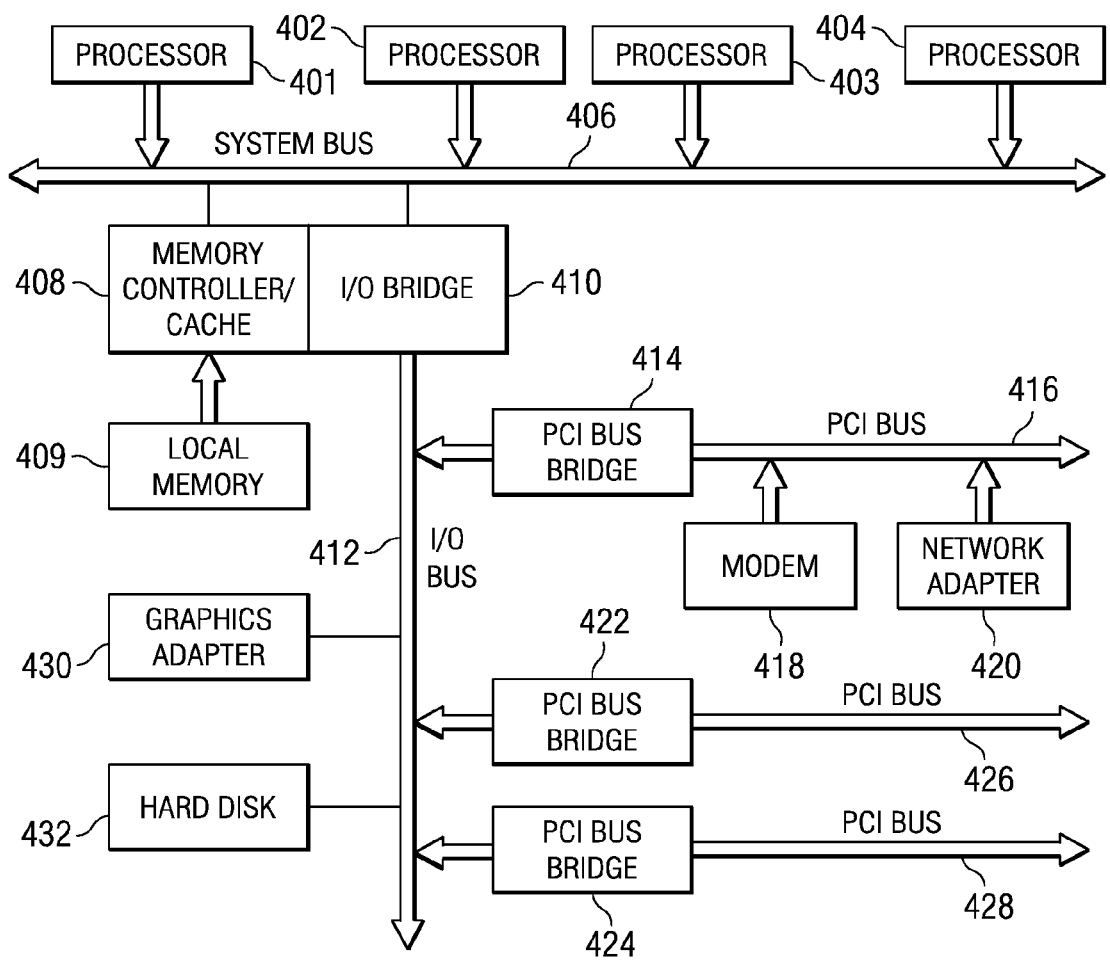
FIG. 4 is an exemplary block diagram of a symmetric multiprocessor system in which exemplary aspects of the illustrative embodiments may be implemented.

With reference now to the figures and in particular with reference to FIGS. 3-4, exemplary diagrams of data processing environments are provided in which embodiments of the present invention may be implemented. It should be appreciated that FIGS. 3-4 are only exemplary and are not intended to assert or imply any limitation with regard to the environments in which aspects or embodiments of the present invention may be implemented. Many modifications to the depicted environments may be made without departing from the spirit and scope of the present invention.

FIG. 3 depicts a pictorial representation of an exemplary distributed data processing system in which aspects of the illustrative embodiments may be implemented. Distributed data processing system 300 may include a network of computers in which embodiments of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, server 304 and server 306 are connected to network 302 along with storage unit 308. In addition, clients 310, 312, and 314 are also connected to network 302. These clients 310, 312, and 314 may be, for example, personal computers, network computers, or the like. In the depicted example, server 304 provides data, such as boot files, operating system images, and applications to the clients 310, 312, and 314. Clients 310, 312, and 314 are clients to server 304 in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

With reference now to FIG. 4, a block diagram of a data processing system which may be implemented as a server, such as server 404 in FIG. 4, is depicted in accordance to the present invention. The data processing system depicted in FIG. 4 may be, for example, an IBM RISC/System 6000 system, a product of International Business Machines Corporation in Armonk, N.Y., running the Advanced Interactive Executive (AIX) operating system.

Data processing system 400 may be a symmetric multiprocessor (SMP) system including a plurality of processors 401-404 connected to system bus 406. Also connected to system bus 406 is memory controller/cache 408, which provides an interface to local memory 409. I/O Bus Bridge 410 is connected to system bus 406 and provides an interface to I/O bus 412. Memory controller/cache 408 and I/O Bus Bridge 410 may be integrated as depicted.

Peripheral component interconnect (PCI) bus bridge 414 connected to I/O bus 412 provides an interface to PCI local bus 416. A modem 418 may be connected to PCI local bus 416. Typical PCI bus implementations will support four PCI expansion slots or add-in connectors. Communications links to network computers 310, 312, and 314 in FIG. 3 may be provided through modem 418 and network adapter 420 connected to PCI local bus 416 through add-in boards.

Additional PCI bus bridges 422 and 424 provide interfaces for additional PCI buses 426 and 428, from which additional modems or network adapters may be supported. In this manner, server 400 allows connections multiple network computers. A memory mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drive and the like also may be used in addition or in place of the hardware depicted. The depicted example is not meant to imply architectural limitations with respect to the present invention.

The processors 401-404, in accordance with the mechanisms of the illustrative embodiments, may constitute different nodes in the SMP system 400. These nodes may be provided on separate integrated circuit (IC) chips, for example, and may be associated with additional internal resources of the IC chip including caches, local memories, arbitration logic, bus agents, input/output (I/O) units, and the like. In fact, the processors 401-404 may actually include one or more processing units (PUs). These internal resources are not depicted in FIG. 4 but are depicted in figures referenced hereafter.

The processors 401-404 may be configured in a star architecture, a ring bus type architecture, or the like. The illustrative embodiments herein assume an architecture in which there is one central bus arbiter that controls granting of ownership requests for the processors 401-404. It should be appreciated, however, that the mechanisms of the illustrative embodiments may be utilized with other architectures without departing from the spirit and scope of the present invention. For example, the mechanisms of the illustrative embodiments may be implemented in an architecture where there is a distributed bus arbitration mechanism, such as described in commonly assigned and co-pending U.S. patent application Ser. No. 11/121,121 and/or Ser. No. 11/120,909, which are hereby incorporated by reference.

Figure 1:
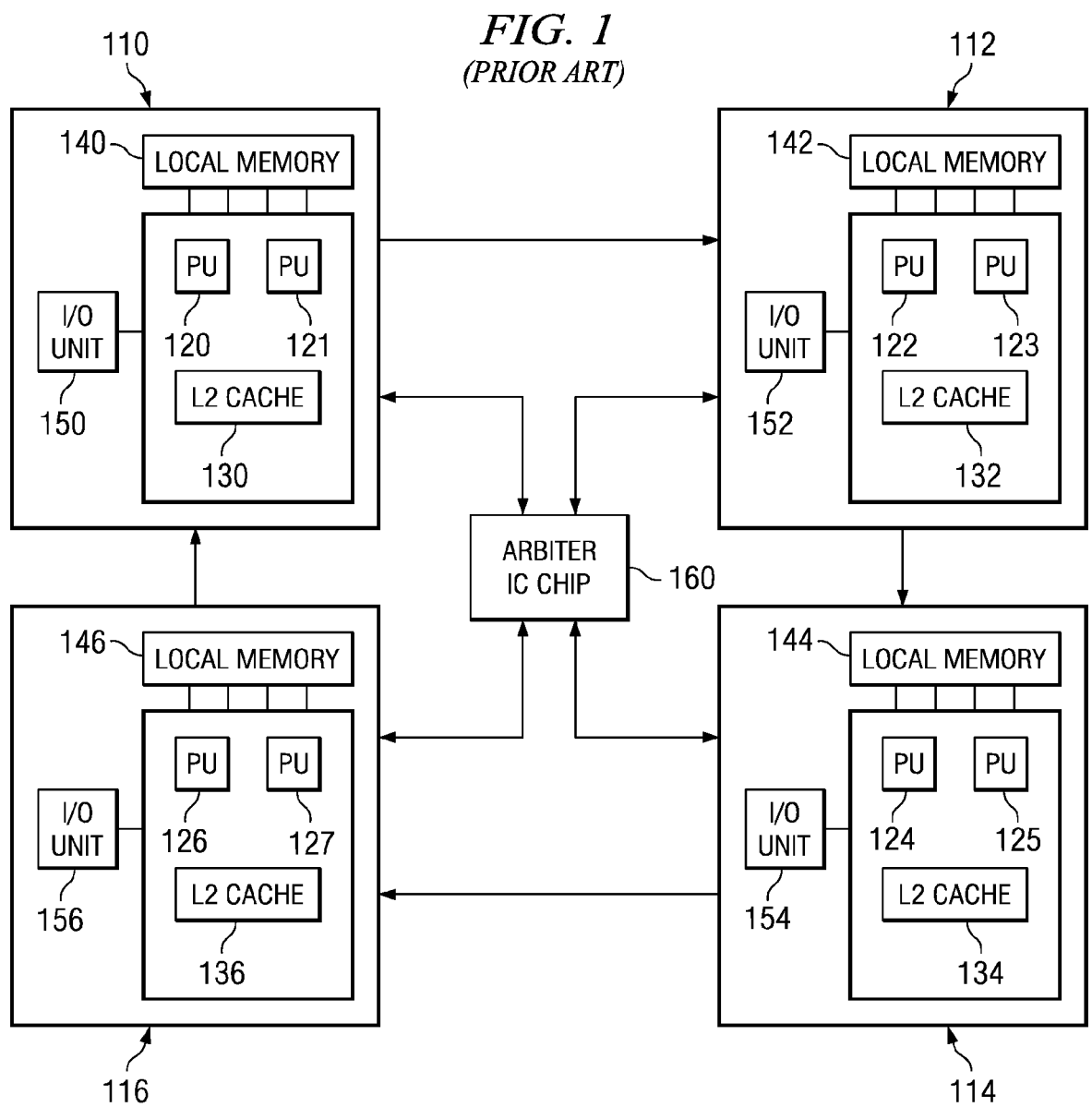
FIG. 1 is an exemplary diagram illustrating a known architecture in which the arbiter is provided as a separate IC chip in the SMP system.
Figure 2:
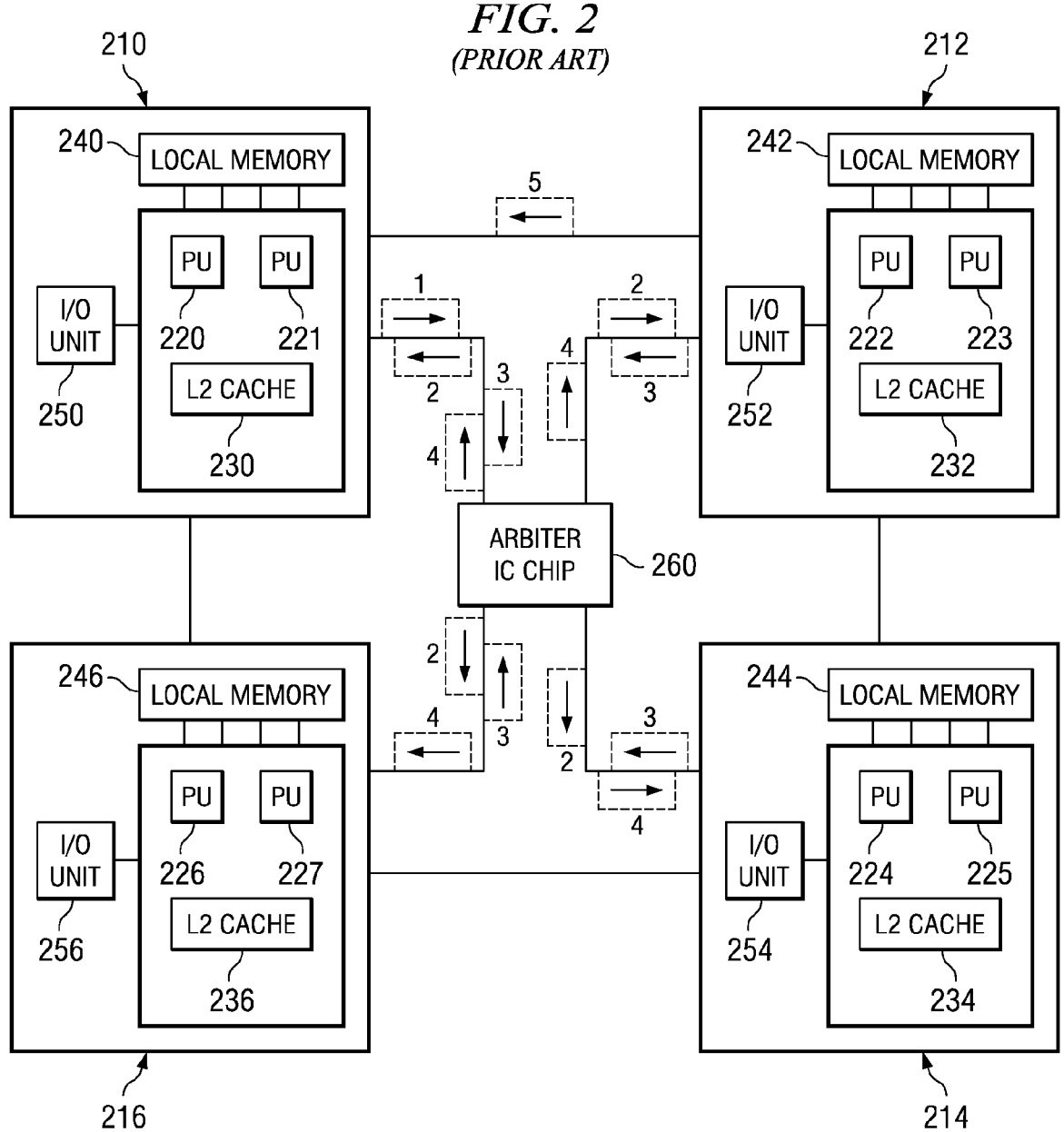
FIG. 2 is an exemplary diagram illustrating a conventional example of a cache miss or direct memory access (DMA) operation through a four node SMP system, such as that shown in FIG. 1 above.

The processors 401-404 may utilize shared memories and shared caches, as depicted in FIGS. 1-2 above. However, the processors 401-404 have a central bus arbitration logic mechanism that operates in an intelligent manner utilizing a new protocol according to the illustrative embodiments herein. Without this intelligent arbitration offered by the mechanisms of the illustrative embodiments, the processors 401-404 may operate in much the same manner as described above with regard to FIGS. 1-2. Thus, without the intelligent arbitration offered by the mechanism of the illustrative embodiments, the processors 401-404 may suffer from the same inefficiencies described above with regard to multiple retries of cache line ownership requests and Kill requests.

The intelligent arbitration logic of the bus agents recognizes when an ownership request of the associated node is a "winner" or "loser" of the ownership. Based on this recognition, the "winner" node may begin data modification without the need to send out a Kill request. The "loser" node(s) may wait for their own ownership requests to be reflected from the bus arbiter and then degrade the ownership request to a Read With Intent to Modify (RWITM). Thus, with the mechanisms of the illustrative embodiments, there is no additional Kill request needed and there is no repeating of ownership requests by "loser" nodes.

The operation of the intelligent bus agents and arbitration logic is described hereafter with regard to FIGS. 5A-5K. FIGS. 5A-5K illustrate a four node SMP system having nodes 510-516. Each node 510-516 has its own internal units including a memory 520-526, one or more processing units (PUs) 530-538, an L2 cache 540-546, and an input/output (I/O) unit 550-556, and bus agents 570-576. A centralized bus arbitration unit 560 is provided, which may be provided as a separate IC chip, for example. As shown in FIGS. 5A-5K, the nodes 510-516 are configured in a hub arrangement with regard to the communication connections between nodes 510-516 and the centralized bus arbiter 560. Thus, each of nodes 510-516 may send commands/data to the centralized bus arbiter 560 which in turn may likewise forward and/or generate and send commands/data to the nodes 510-516.

In the example depicted in FIGS. 5A-5K it is assumed that two nodes each send ownership requests (Dclaim requests) for a same shared cache line, e.g., node0 510 and node3 516 send Dclaim requests for a same shared cache line. This does not necessarily mean that both nodes 510 and 516 are attempting to access the same shared memory addresses, but are attempting to access shared memory addresses that are part of the same shared cache line.

The operation follows the same five phases as previously discussed above, i.e. the phases are as follows:

(1) a bus agent 570-576 sends out a Dclaim request to the bus arbiter 560 with a transaction tag;

(2) the bus arbiter 560 reflects the request out to all bus agents 570-576 with the requestor's transaction tag;

(3) the bus agents 570-576 snoop the request and provide a snoop reply with the requestor's transaction tag;

(4) the bus arbiter 560 combines all the snoop replies from the bus agents 570-576 and broadcasts a combined response back to all bus agents 570-576 with the requestor's transaction tag; and (5) data modification is performed if the combined response is "good" (e.g., Non-retry).

However, with the intelligent bus agents 570-576 and arbitration logic in bus arbiter 560 of the illustrative embodiments which implement the new protocol as illustrated in FIGS. 5A-5K, after the first phase, the bus agent 570-576 monitors the reflected request in phase three. If a bus agent 570-576 receives a reflected request that is the result of its own Dclaim request, which is identified by matching the transaction tag, then the bus agent 570-576 becomes the "winner" and may go ahead and perform data modification without the need to send out a Kill request. The bus agents 570-576 that see the reflected request with a transaction tag that does not match their Dclaim request transaction tag become "losers." The losers wait for their own Dclaim request to be reflected from the bus arbiter 560 and then invalidate their cache line and degrade their ownership request to a Read With Intent to Modify (RWITM).

Figure 5A:
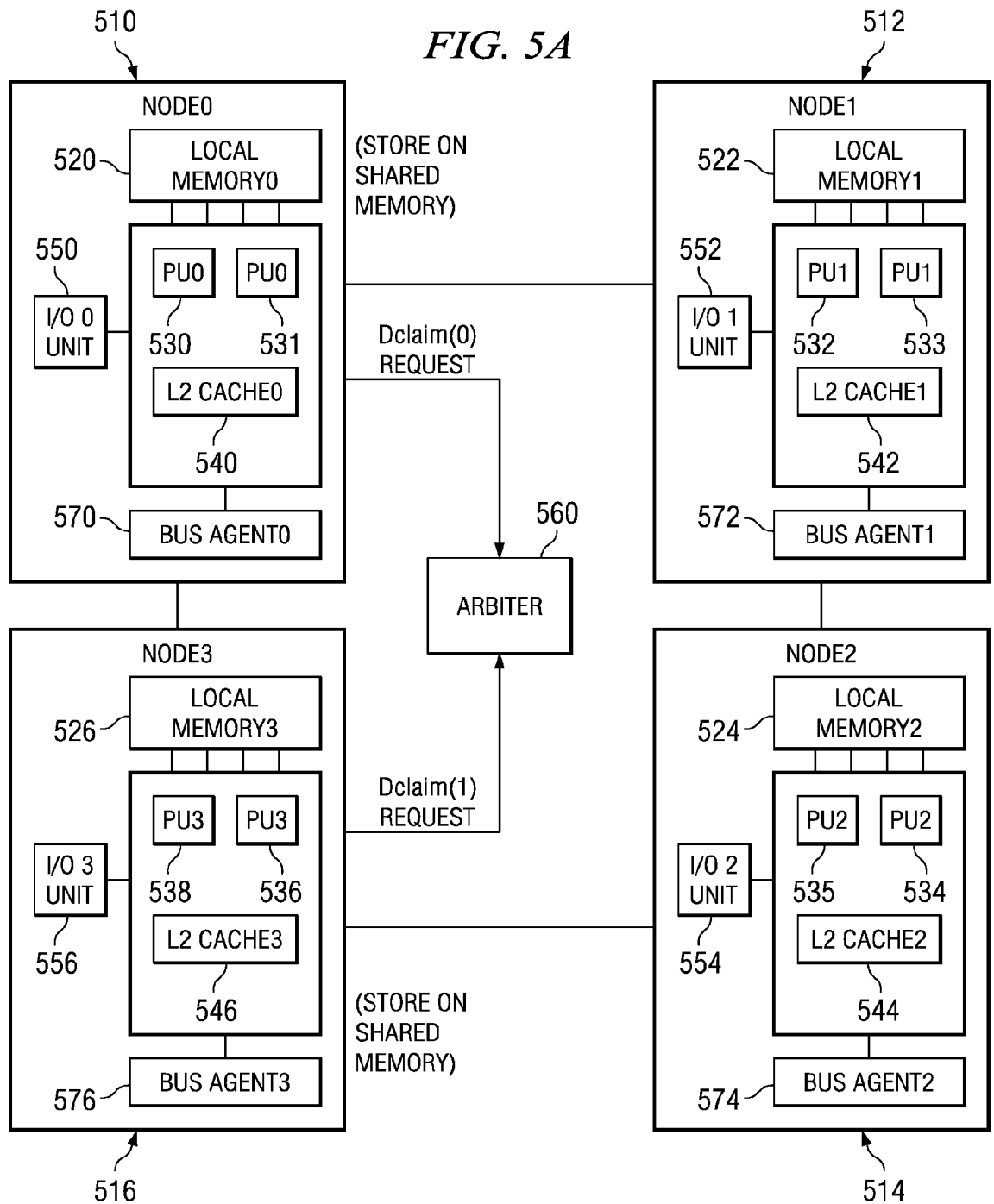

Referring to FIG. 5A, it is assumed that node0 510 and node3 516 both wish to perform store operations to shared system memory via their own L2 caches 540 and 546 which are shared caches, meaning that the caches store data from any one of the nodes 510-516 in the system. The store operations from nodes 510 and 516 target data present in the same cache line. As part of the store operations, the nodes 510 and 516 must obtain ownership of the cache line that is targeted by the store operation. The centralized arbiter 560 performs arbitration operations in accordance with the illustrative embodiments to arbitrate these conflicting ownership requests. As a result of the store operations, the nodes 510 and 516 must search, e.g., by performing a Cache Directory lookup operation, for the cache lines that contain the data corresponding to the address ranges that are targeted by these store operations. It should be appreciated that for this example, a store operation is utilized, but the illustrative embodiments are not limited to store operations. Any shared system memory access operation may be performed within the spirit and scope of the illustrative embodiments.

As depicted in FIG. 5A, the operation starts with the bus agent 570 of node0 510 sending a Dclaim request to the centralized arbiter 560, and the bus agent 576 of node3 516 sending a Dclaim request for ownership of the same shared cache line, which may be present in one or more of the L2 caches 540-546, to the centralized arbiter 560. The Dclaim requests specify an address range for which ownership is desired, a unique transaction tag for the transaction, and other parameters. It should be noted that the address range specified in the Dclaim requests may not be identical, but are directed to the same shared cache line.

Figure 5B:
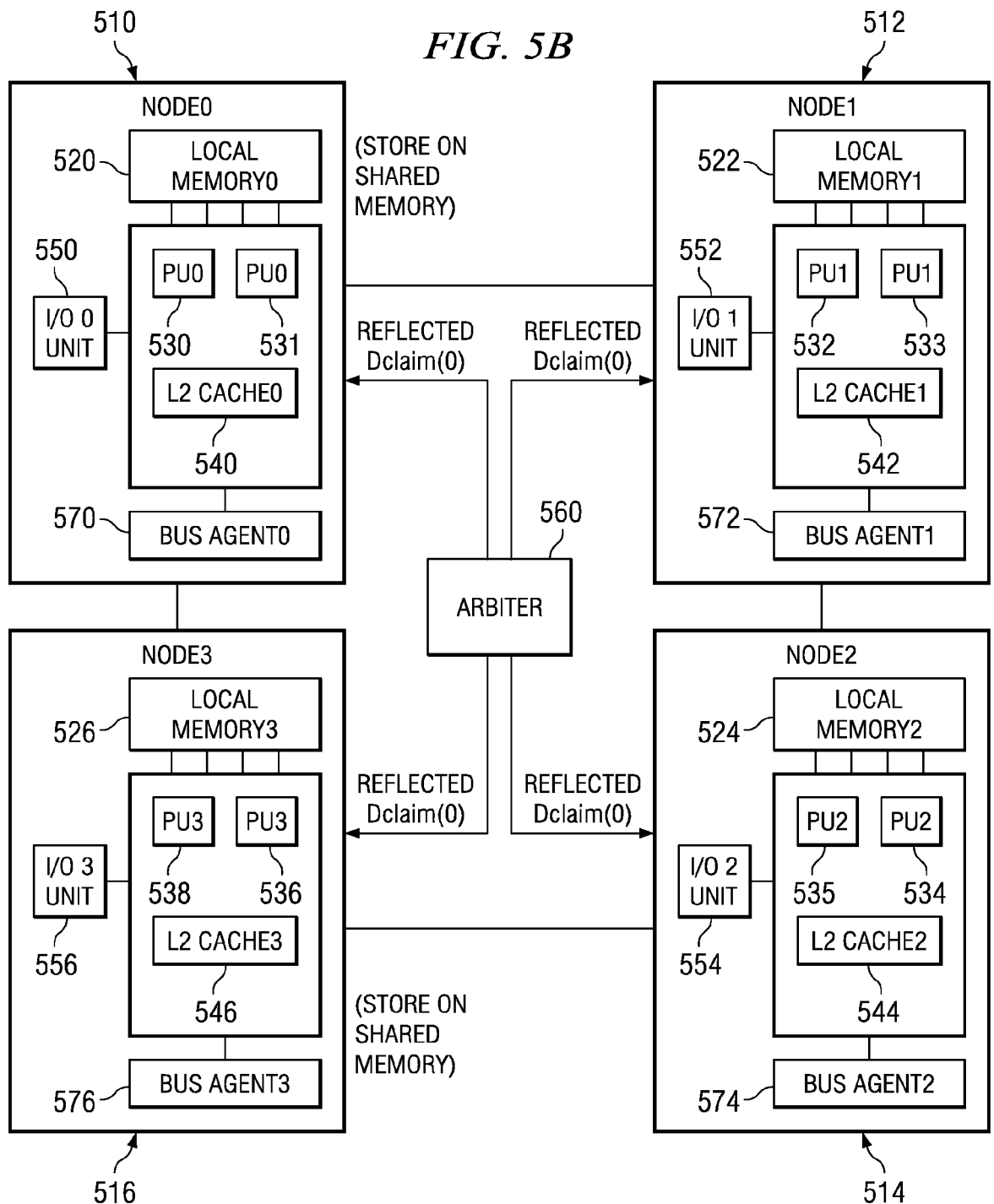

In response to receiving the Dclaim requests, as shown in FIG. 5B, the arbiter 560 reflects the Dclaim requests to the bus agents 570-576 of each of the nodes 510-516. Since the arbiter 560 receives the Dclaim request from node0 510 first, the arbiter 560 reflects this Dclaim request, i.e. Dclaim(0), to nodes 510-516 first. Thereafter, the Dclaim request from node3 516, i.e. Dclaim(1), is received in the arbiter 560.

When the bus agents 570-576 receive the reflected Dclaim request, the bus agents snoop the Dclaim request to determine an appropriate response. For example, as part of the snooping of the Dclaim(0), the bus agents 570-576 of the nodes 510-516 determine if the data corresponding to the address range specified in the Dclaim(0) request is currently present in the memory or cache of the node, whether the data is valid if present in the node, and whether the data has been modified if present in the node. If the data is not currently present or invalid in the cache of the node, then the corresponding bus agent returns a snoop reply with a "Null" bit set, i.e. a snoop reply NULL. If the data is currently present in the cache, and is valid and in a "shared" state, then the data is in a "shared state" and an snoop reply of SHARED is returned. If the bus agent of the node is too busy to perform the snoop operation, e.g., queues are full, then the bus agent returns a snoop reply with the retry bit set, i.e. a snoop reply RETRY.

In accordance with the illustrative embodiments, the bus agents 570-576 of the nodes 510-516 implement additional logic from that of known systems. This additional logic serves to allow nodes to discern whether or not they are the "winner" or "loser" of ownership of a particular shared cache line based on the reflection of Dclaims(0) and to prepare to be the "winner" or "loser" of the ownership request. By "preparing to be the winner" what is meant is that the state machine implemented by the bus agent transitions to a state where the bus agent awaits a combined response from the bus arbiter 560 and may immediately perform the data access without having to perform a Kill operation. By "preparing to be the loser" what is meant is that the state machine implemented by the bus agent transitions to a state where the bus agent awaits a reflected request corresponding to its own original ownership request without having to resubmit its original ownership request.

For example, when node3 516 receives the reflected Dclaim(O) from the arbiter 560, the bus agent 576 in node3 516 compares the transaction tag associated with Dclaim(0) to the transaction tag for its currently outstanding Dclaim(1) request. Since the transaction tags do not match, the bus agent 576 determines that it is a "loser" of the ownership request for the shared cache line. Thus, the bus agent 576 prepares to be the "loser." Such preparation may involve invalidating the original Dclaim request in the bus agent 576 and generating a Request With Intent to Modify (RWITM) request to be sent out in response to the eventual reflection of Dclaim(1), for example.

Similarly, when the arbiter 560 sends the reflected Dclaim (0) to the bus agent 570 of node0 510, the bus agent 570 compares the transaction tag of the reflected Dclaim(0) with the transaction tag associated with the original Dclaim(0) sent out by node0 510. Since the transaction tags match, the bus agent 570 of node0 510 determines itself to be the "winner" of the ownership request. Corresponding tasks involve performing the necessary operations to initiate modification of the data corresponding to the address range specified in the Dclaim(0) request.

As shown in FIG. 5C, the bus agents 570-576 of each of the nodes 510-516 respond to the reflected Dclaim(0) with a snoop reply NULL(0). The bus agents 572 and 574 of node1 512 and node2 514 reply to the arbiter 560 with a snoop reply NULL(0) because they do not currently have the cache line corresponding to the requested address range in the Dclaim (0) request. The bus agent 576 of node3 516 sends a snoop reply NULL(0) and the bus agent 576 of node3 516 prepares to be the "loser" because the reflected Dclaim(0) was not its own Dclaim(1) request. The bus agent 570 of node0 510 replies with a snoop reply NULL(0) and the bus agent 570 of node0 510 prepares to be the "winner" because the reflected Dclaim(0) was its own Dclaim(0).

Figure 5D:
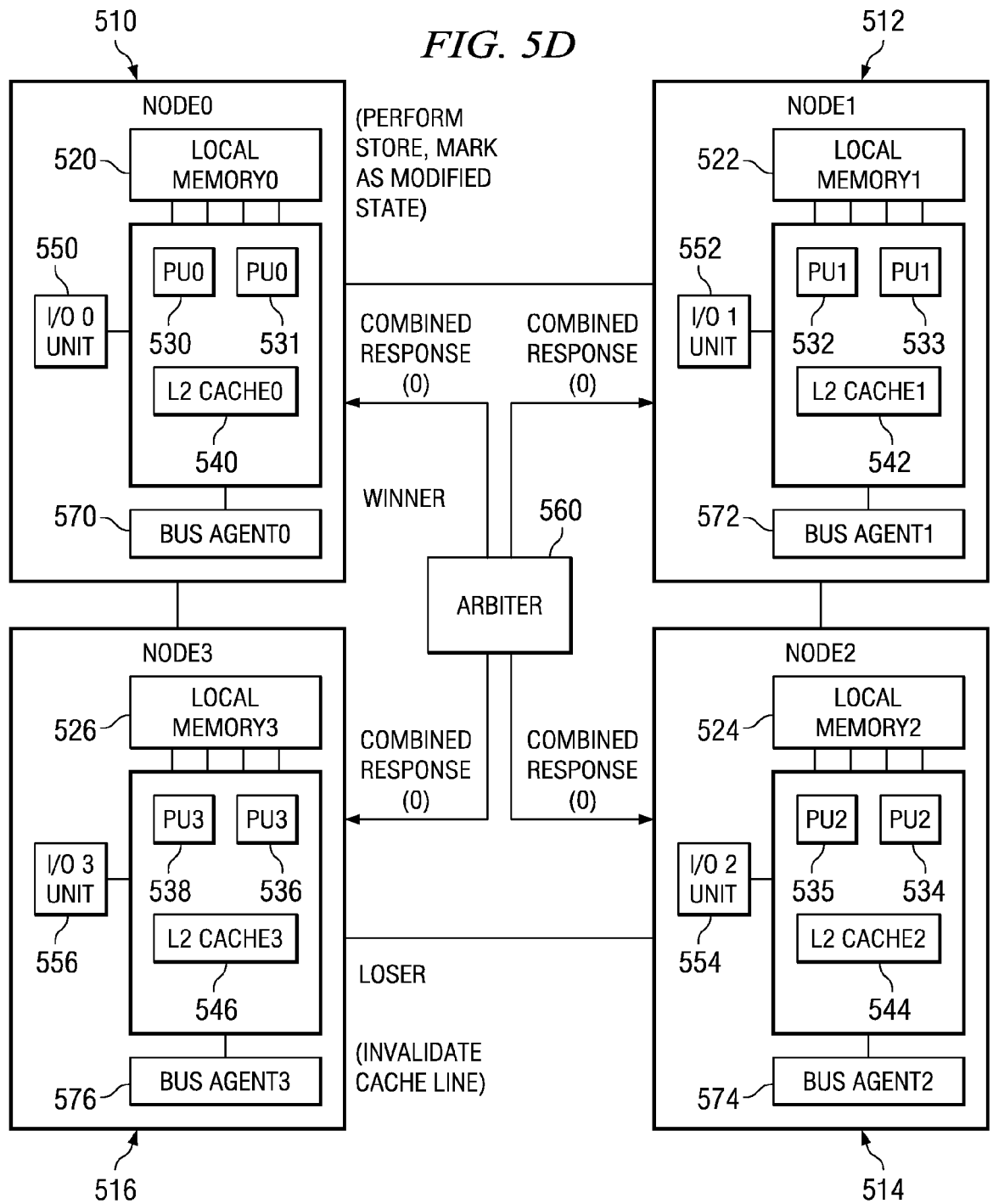

As shown in FIG. 5D, the arbiter 560 gathers the snoop replies from the bus agents 570-576 of nodes 510-516 and generates a combined response that it then sends out to the bus agents 570-576 of each of the nodes 510-516. In the depicted example, since each of the snoop replies was a snoop reply NULL(0), the combined response is also a NULL(0) combined response.

When the bus agent 576 of node3 516 receives the combined response NULL(0), it becomes the loser and the bus agent 576 marks the cache line in its own L2 cache corresponding to the address range of the Dclaim(0) and Dclaim(1) as invalid, in accordance with the MERSI cache coherency protocol. The bus agent 576 of node3 516 then waits for its own Dclaim(1) request to be reflected to it by the arbiter 560.

Similarly, when the bus agent 570 of Node0 510 receives the combined response NULL(0), it becomes the cache line owner and performs the store to the cache line of its own L2 cache, and marks the cache line as having a modified state, in accordance with the MERSI cache coherency protocol. It should be noted that, in performing the store to the cache line, there is no need to send a Kill request to the other nodes 512-516. Thus, the inefficiencies present in known SMP systems in which a Kill request must be submitted, the Kill request must be reflected to each of the nodes, Kill replies are sent by each of the nodes, the Kill replies are collected and a combined Kill response is sent out to each of the nodes, and Dclaim requests are retried are eliminated by the mechanisms of the illustrative embodiments.

Figure 5F:
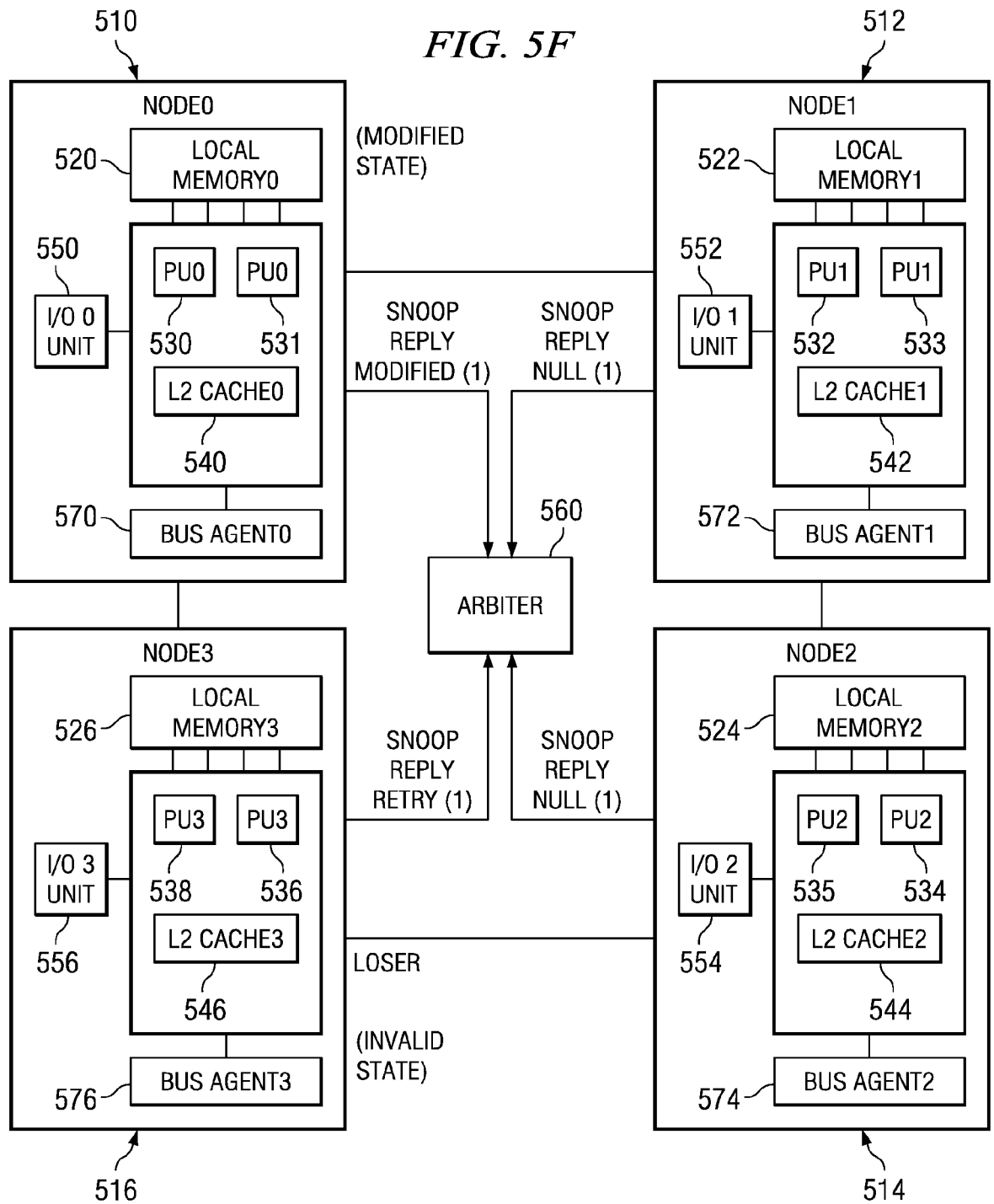

After node0's Dclaim(0) request has been handled, the arbiter 560 reflects Dclaim(1), which was originally sent by the bus agent 576 of node3 516 as shown in FIG. 5E. As shown in FIG. 5F, the bus agents 572 and 574 of node1 512 and node2 514 reply with a snoop reply NULL(1) since neither node current has the cache line corresponding to the address range specified in the Dclaim(1) request. The bus agent 576 of node3 516 recognizes its own request while in a "loser" state in which the cache line in its L2 cache is now invalid, and sends out a snoop reply RETRY(1). The bus agent 570 of node0 510 asserts a modified state of the cache line and forwards a snoop reply MODIFIED(1) to the arbiter 560

Figure 5G:
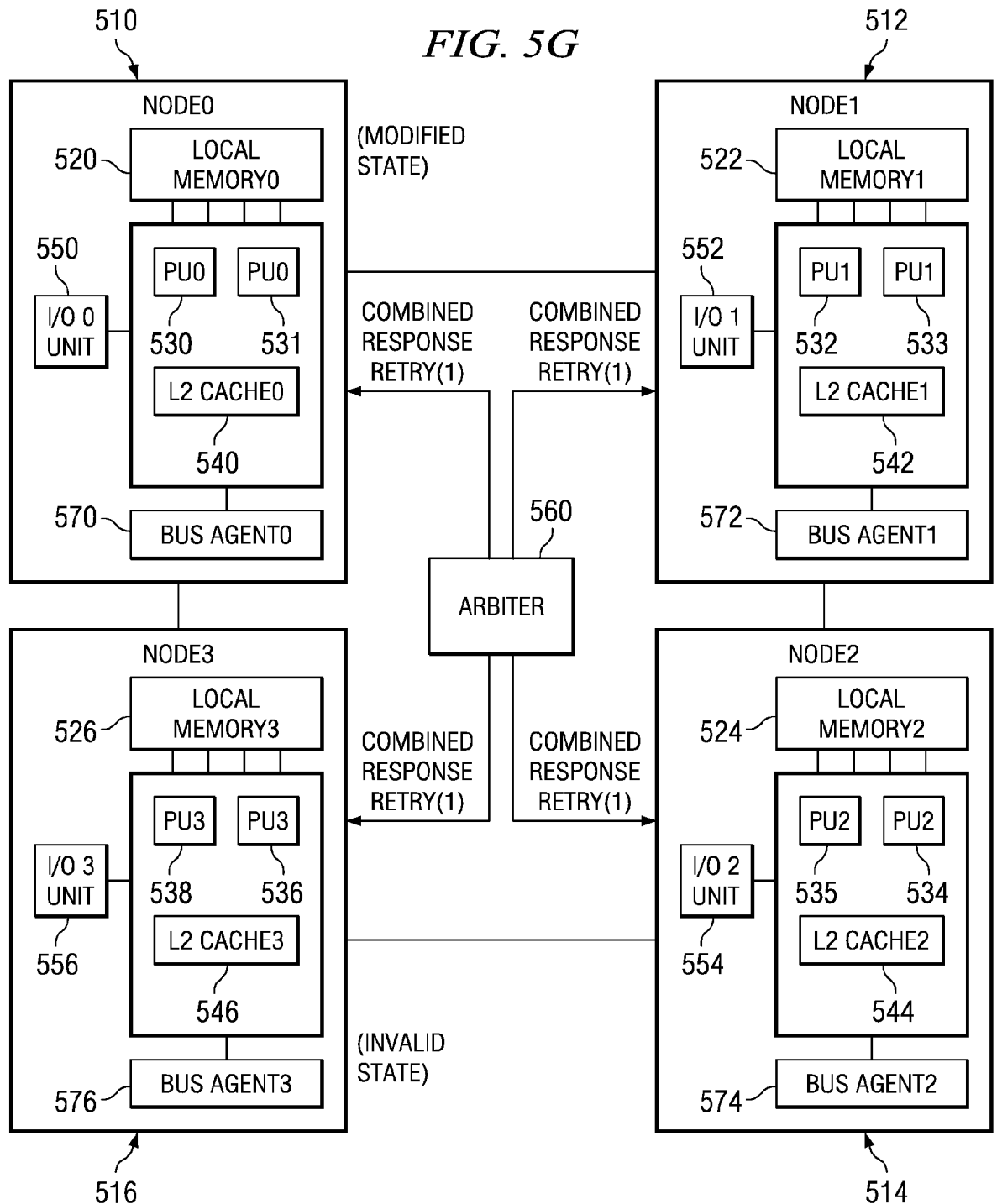

As shown in FIG. 5G, in response to receiving the snoop replies from the nodes 510-516, the arbiter 560 generates a combined response which, in the depicted example, is a combined response RETRY(1) since at least one node responded with a snoop reply RETRY(1). The combined response RETRY(1) is forwarded to the bus agents 570-576 of all of the nodes 510-516. Since the bus agent 576 of node3 516 receives the combined response RETRY(1), and the bus agent 576 of node3 516 is currently in a "loser" state, the bus agent 576 of node3 516 knows, via its intelligent logic, that the bus agent of one of the other nodes must have the data targeted by its Dclaim(1) request. As a result, the bus agent 576 of node3 516 prepares a new Read With Intent to Modify (RWITM) request for the address range. The RWITM request indicates that node3 516 is requesting that the data targeted by the RWITM request be transferred from another node's L2 cache to the L2 cache of node3 516 so that it may be modified by node3 516.

Figure 5H:
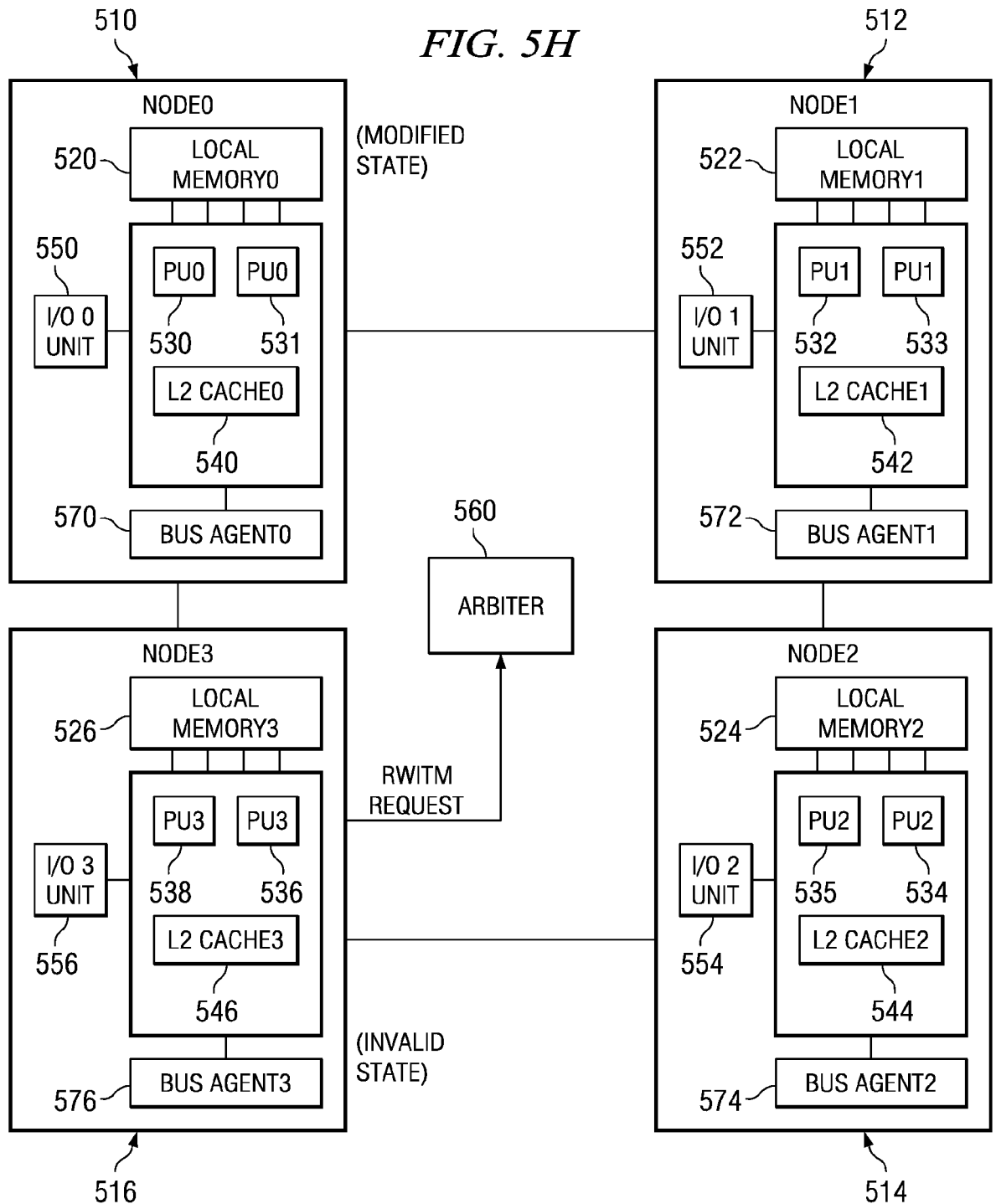
Figure 5I:
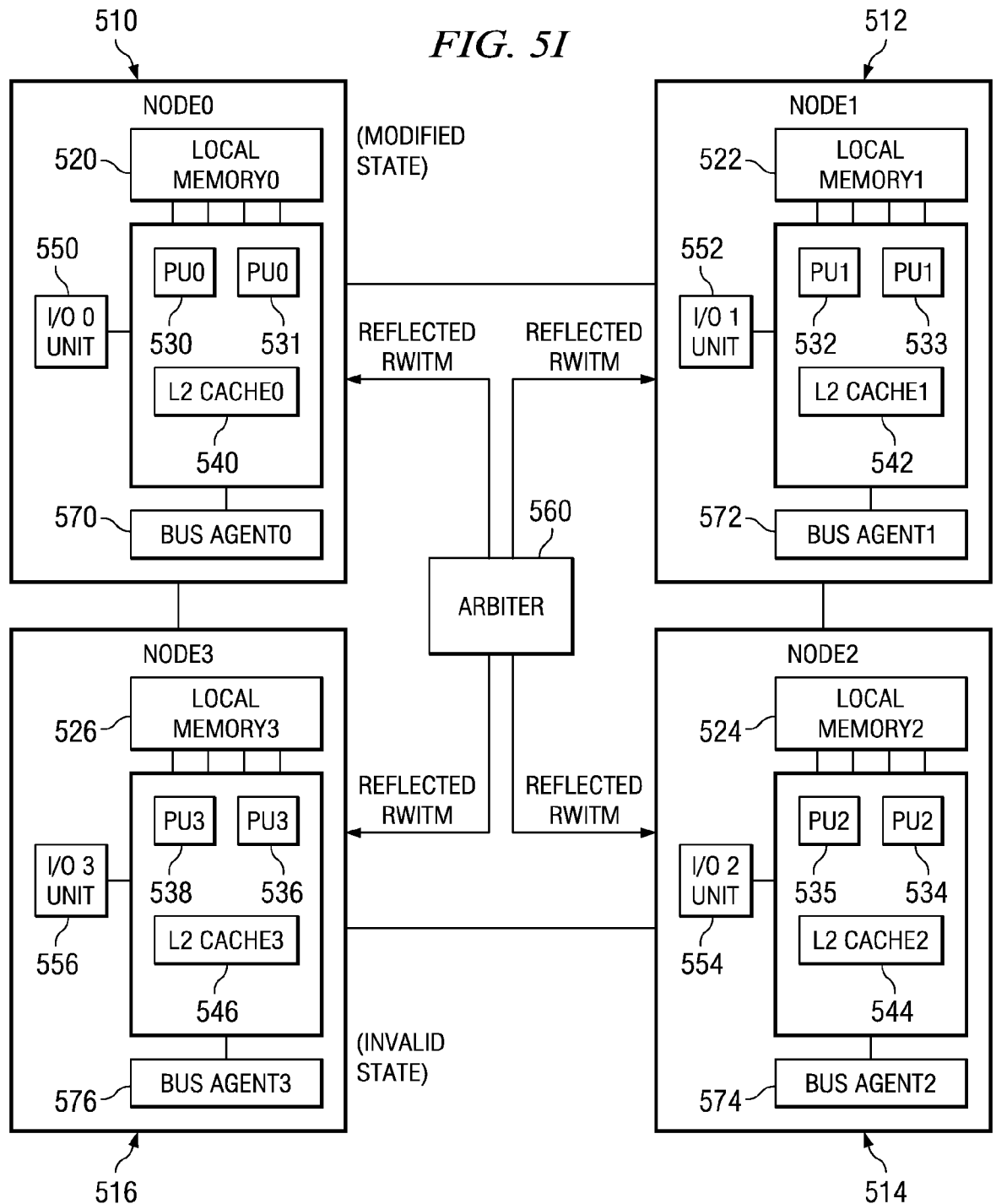
Figure 5J:
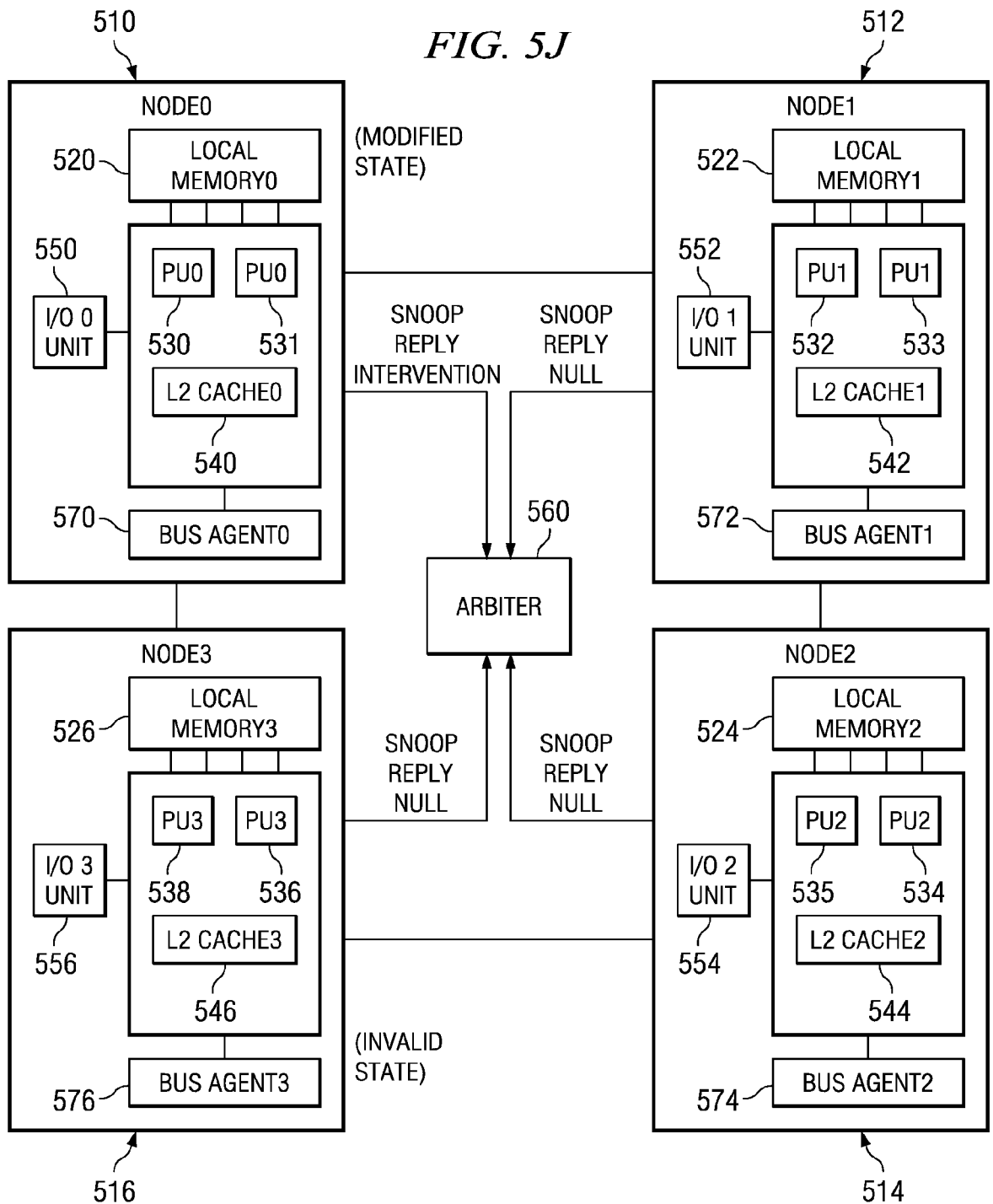

As shown in FIG. 5H, the bus agent 576 of node3 516 sends the RWITM request to the bus arbiter 560. The arbiter 560 reflects the RWITM request to each of the nodes 510-516, as shown in FIG. 5I. The bus agents 570-576 of each of the nodes 510-516 snoop the reflected RWITM request and provide a snoop reply to the arbiter 560 of node1 512. As shown in FIG. 5J, the bus agents 572-576 of nodes 512-516 reply with a snoop reply NULL indicating that they currently do not have the cache line targeted by the RWITM request, as determined from the specified address range in the RWITM request. The bus agent 570 of node0 510 asserts a modified state of the targeted cache line and returns a snoop reply INTERVENTION to the arbiter 560 indicating that node0 510 currently has the most up-to-date version of the targeted data in a modified state and will intervene in the RWITM request.

Figure 5K:
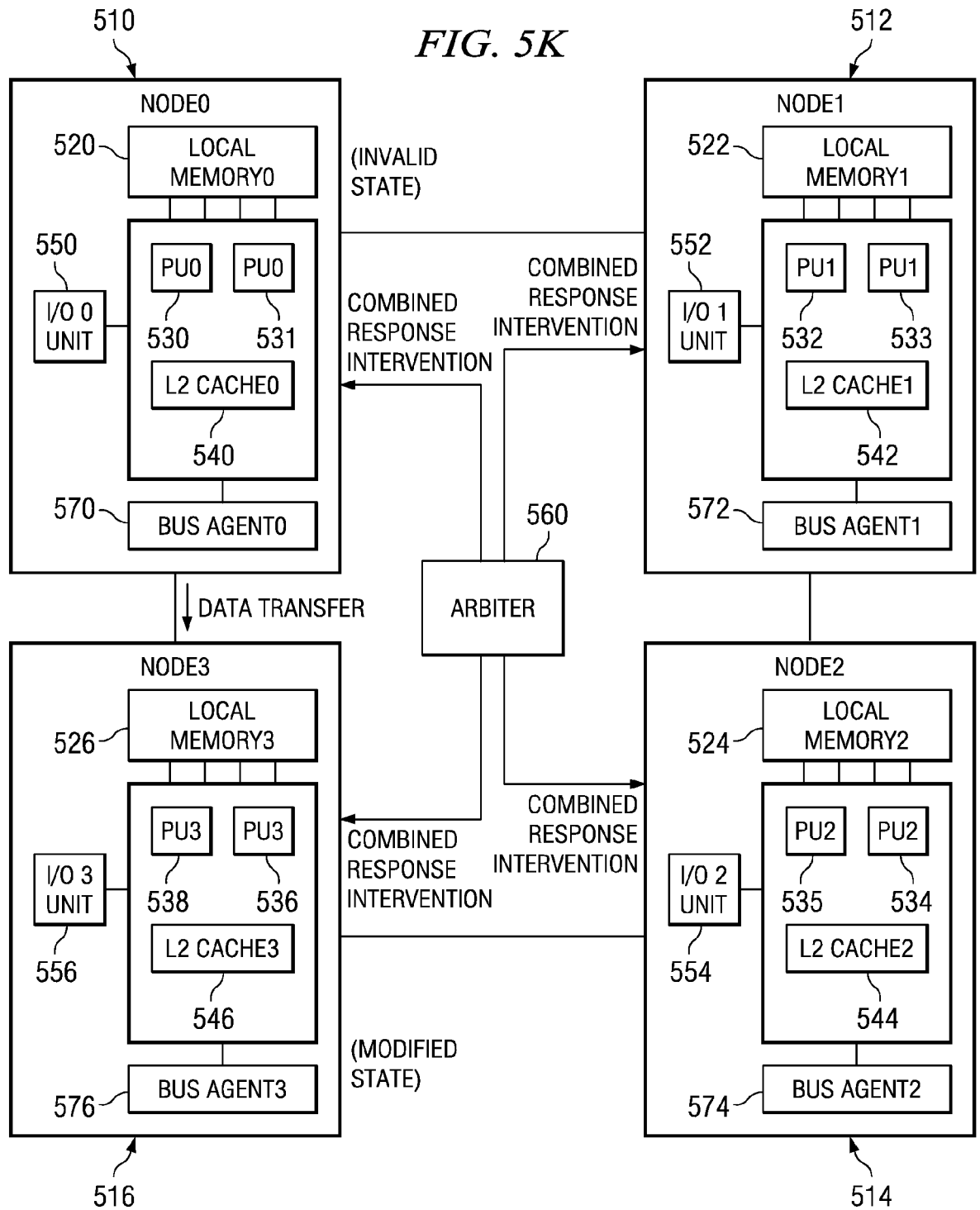

The arbiter 560 receives the snoop replies from bus agents 570-576 of the nodes 510-516 and generates a combined response. As shown in FIG. 5K, this combined response is a combined response INTERVENTION which is forwarded to the bus agents 570-576 of each of the nodes 510-516. In response to receiving the combined response INTERVENTION at node0 510, the bus agent 570 of node0 510 sends out the data corresponding to the targeted address range in the RWITM request and invalidates the cache line in its own L2 cache. This data is forwarded by the bus agents 572 and 574 of node1 512 and node2 514 to the bus agent 576 of node3 516. Node3 516 then performs the store operation and marks the cache line in its own L2 cache as being in a modified state.

Thus, using the new protocol and intelligent arbitration logic of the illustrative embodiments, multiple ownership requests from multiple nodes of an SMP system may be resolved efficiently without having to perform a number of command transfers to perform Kill requests, retry ownership requests, etc. With the mechanisms of the illustrative embodiments, "food fights" that may occur in known systems, where two or more nodes continue to retry ownership requests repeatedly until they are granted ownership, are avoided.

Figure 6:
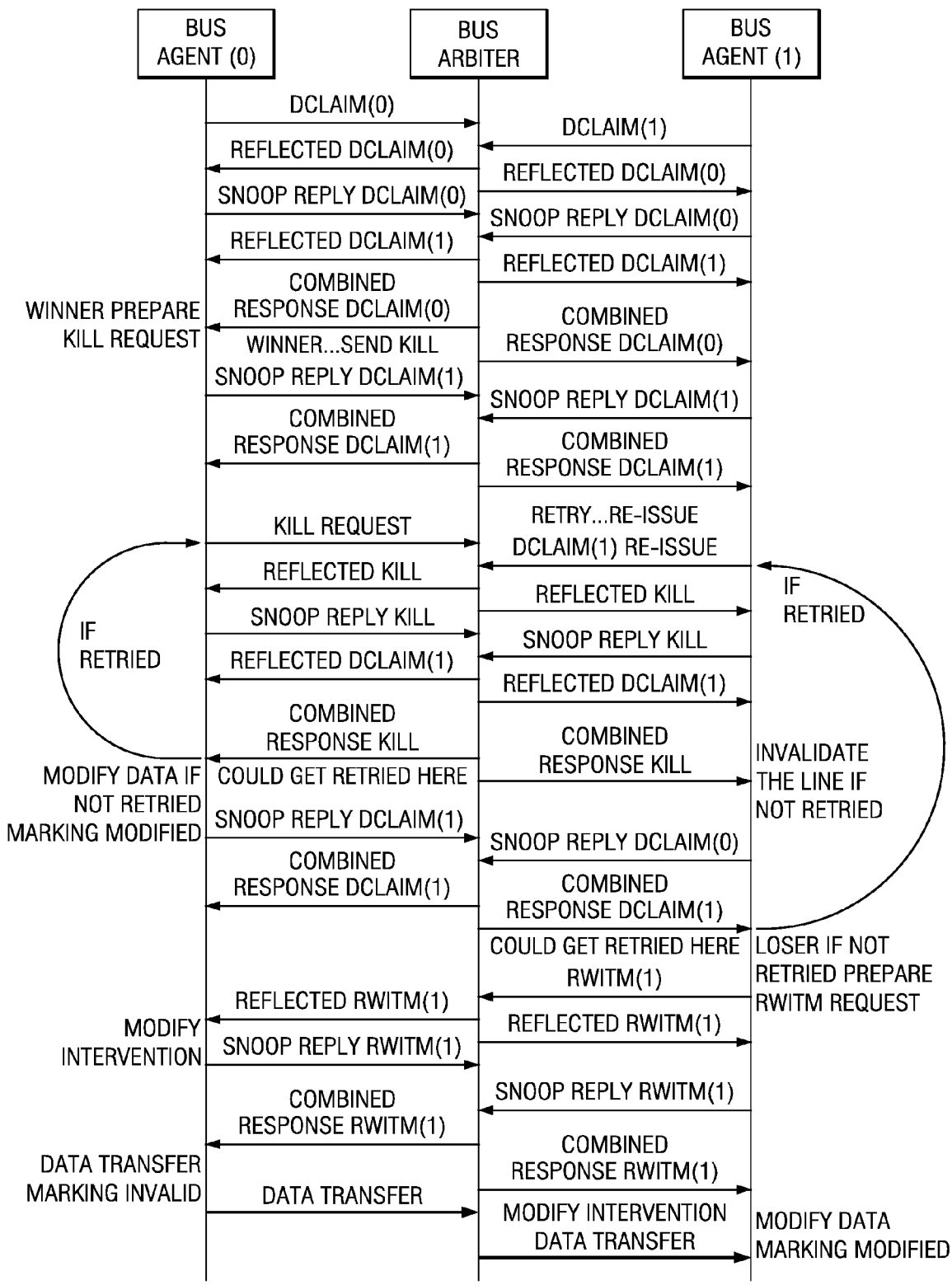
FIG. 6 is an exemplary message flow in accordance with a known bus arbitration mechanism.

FIG. 6 is an exemplary message flow in accordance with a known bus arbitration mechanism which illustrates the "food fight" scenario often encountered in known SMP systems. As shown in FIG. 6, bus agent(0) sends a first ownership request, Dclaim(0), to the bus arbiter followed by bus agent(1) sending a second ownership request, Dclaim(1), to the bus arbiter. Dclaim(0) is reflected to both bus agent(0) and bus agent(1) which each respond with a corresponding snoop reply. Thereafter, Dclaim(1) is reflected to both bus agent(0) and bus agent(1).

The bus arbiter gathers the snoop replies for Dclaim(0) and sends out a combined response for Dclaim(0) to both bus agent (0) and bus agent(1). As a result, bus agent(0) becomes the winner of the ownership request and begins to issue a Kill request. In the meantime, the bus agents(0) and (1) provide snoop replies for Dclaim(1) to the bus arbiter which gathers these replies and sends out a combined response to Dclaim (1). As a result, bus agent(1) is informed that it is the loser of the ownership request and must retry its ownership request.

Bus agent(0) sends out the Kill request to the bus arbiter which reflects the Kill request to bus agents(0) and (1). Snoop replies to the Kill request are sent by the bus agents(0) and (1) to the bus arbiter which gathers these snoop replies and sends out a combined response to the Kill request to each of the bus agents(0) and (1).

In the meantime, Dclaim(1) is re-issued to the bus arbiter which reflects the Dclaim(1) to both bus agents(0) and (1). Again, the bus arbiter gathers snoop replies from the bus agents(0) and (1) for the re-issued Dclaim(1) and sends out a combined response to the re-issued Dclaim(1). At this point, bus agent(1) may again retry the Dclaim(1) if ownership is again not granted. Moreover, when the combined Kill response is sent by the bus arbiter to the bus agent(0), the bus agent(0) may retry this Kill request based on the combined Kill response received, i.e. a retry response. These two retry areas in the depicted message flow illustrate the "food fight" that the bus agents may get involved in when fighting over who gets to modify the data in the shared cache line.

Once the combined Kill response from the bus arbiter indicates that the Kill has been performed accordingly, the data targeted by the Dclaim(0) request may be modified by the bus agent(0) and the cache line marked as modified. Similarly, with bus agent(1) eventually a maximum number of retries of the Dclaim(1) may be exceeded, or the Dclaim(1) request may timeout, and the cache line in its local cache is invalidated. The bus agent(1) may then issue a RWITM request which is reflected by the bus arbiter to both bus agents. The bus agents send snoop replies to the RWITM request, the bus arbiter sends out a combined response to the RWITM, and data transfer from the cache associated with bus agent(0) to the cache associated with bus agent(1) is performed. The bus agent(1) may then allow modification of the data in its own associated cache and may mark the cache line as modified.

Figure 7:
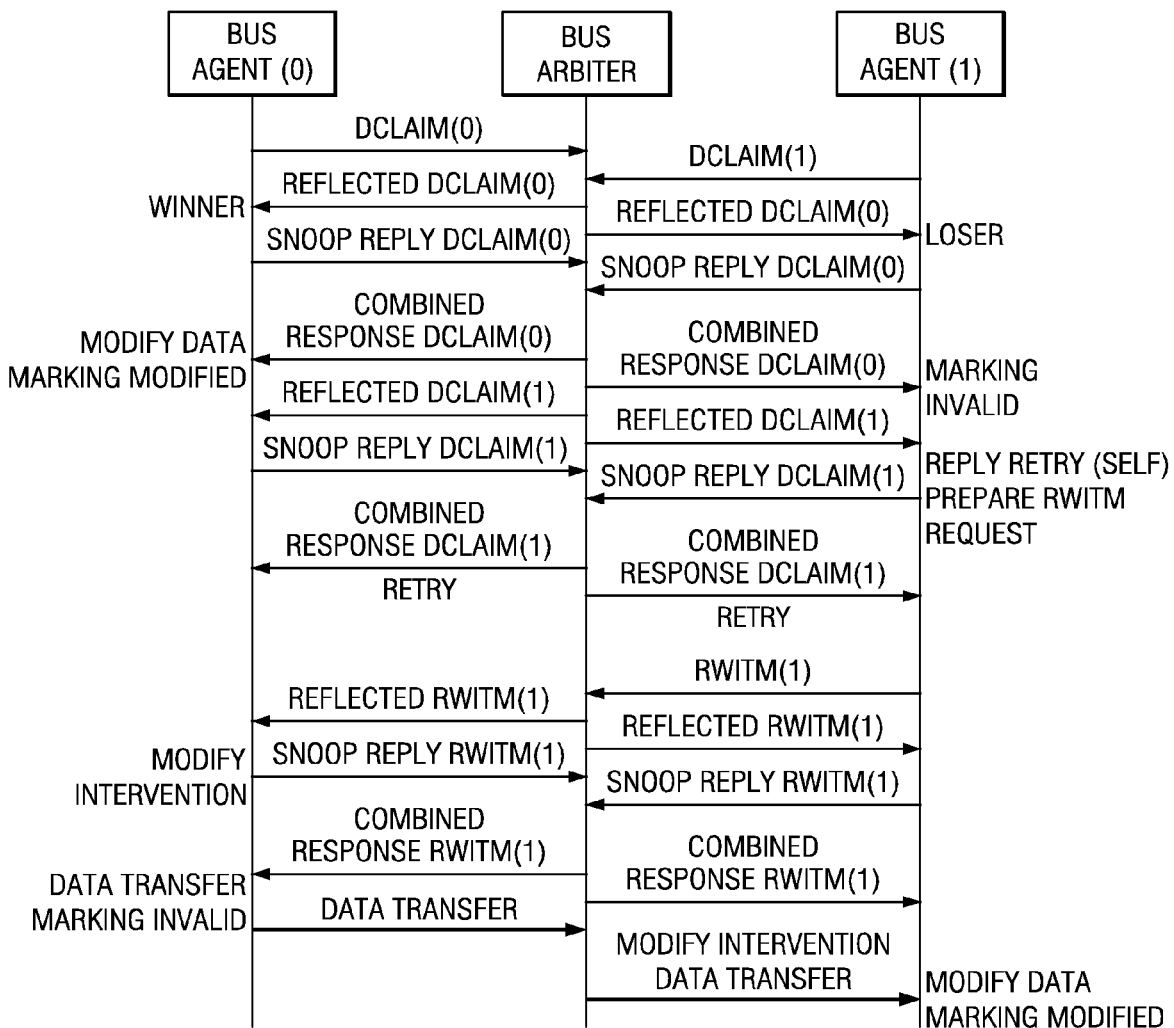
FIG. 7 is an exemplary message flow in accordance with an illustrative embodiment.

FIG. 7 is an exemplary message flow in accordance with an illustrative embodiment. It can easily be send from this message flow that the complexity of the interactions between the bus agents and the bus arbiter is significantly reduced. Primarily, the "food fight" associated with the Kill request and the repeated re-issuing of Dclaim(1) is eliminated in this message flow. Rather, as soon as the Dclaim(0) request is reflected to both bus agent(0) and bus agent(1), each bus agent knows whether it is a winner or a loser of the ownership request. Furthermore, in response to receiving the combined response for Dclaim(0), bus agent(0) knows it is now able to modify the data in its own associated cache and mark the cache line as modified. Bus agent(1) knows that it is indeed the loser of the ownership request and can mark its own cache line as invalid. Moreover, rather than retrying the Dclaim(1) request in bus agent(1), since bus agent(1) already knows it is a loser of the ownership request, bus agent(1) prepares a RWITM request and awaits reflection of its Dclaim(1) request.

Figure 8:
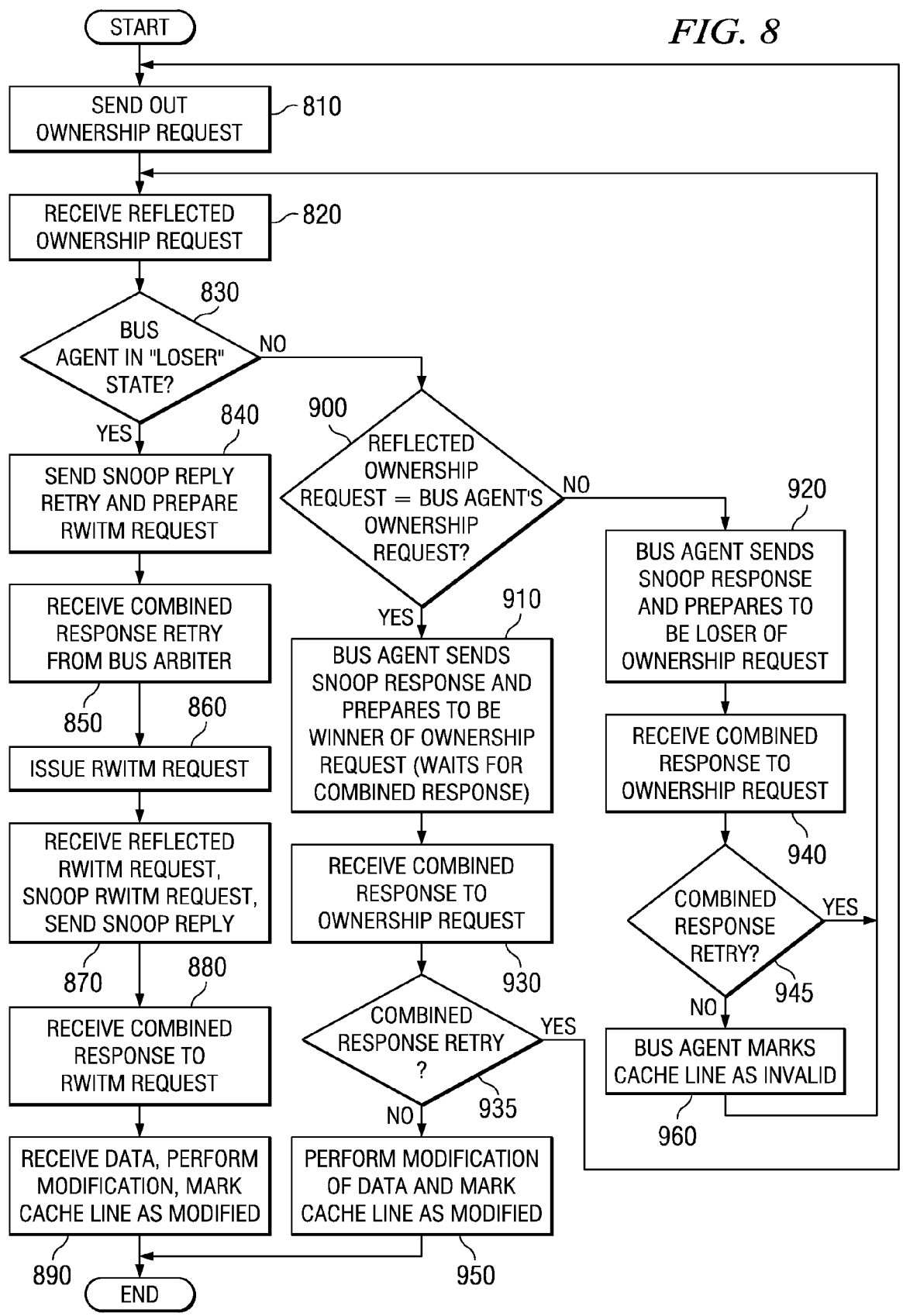
FIG. 8 is a flowchart outlining an exemplary operation of a bus agent in accordance with one illustrative embodiment.

FIG. 8 is a flowchart outlining an exemplary operation of a bus agent in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 8, the operation starts with the bus agent sending out an ownership request to a bus arbiter (step 810). The bus agent receives a reflected ownership request from the bus arbiter (step 820). The bus agent snoops the reflected ownership request and determines if it is already in a "loser" state based on receipt of a previous reflected ownership request (step 830). If so, then the bus agent sends a snoop reply RETRY to the bus arbiter and prepares a RWITM request (step 840). The bus agent then receives a combined response retry from the bus arbiter (step 850) and issues the RWITM request (step 860). The bus agent receives the reflected RWITM request, snoops the RWITM request and sends a snoop reply to the bus arbiter (step 870). A combined response to the RWITM request is received by the bus agent indicating a modify intervention (step 880). Thereafter, the bus agent receives the data from another node and performs modification of the data and marks the cache line as modified (step 890). The operation then terminates.

If the bus agent is not already in a "loser" state, the bus agent determines if the reflected ownership request has a transaction tag that matches the transaction tag associated with its own asserted ownership request (step 900). If so, the bus agent prepares to be the winner of the ownership request (step 910). If the transaction tag of the reflected ownership request does not match the transaction tag of the asserted ownership request, the bus agent prepares to be a loser of the ownership request (step 920).

The bus agent then receives a combined response to an ownership request (steps 930, 940). The bus agent determines if the combined response is a retry combined response (steps 935, 945). If the combined response is a retry, the operation returns to step 810 and retries the ownership request. If the bus agent is the winner of the ownership request, and the combined response is not a retry, the bus agent performs modification of the data in its associated local cache and marks the cache line as modified (step 950). If the bus agent is the loser of the ownership request, and the combined response is not a retry, the bus agent marks its cache line in its associated local cache as invalid (step 960). Thereafter, or if the bus agent is the loser of the ownership request and the combined response is a retry, the operation of the "loser" bus agent then returns to step 820.

Thus, the mechanisms of the illustrative embodiments reduce the inefficiencies of known arbitration mechanisms in SMP systems by providing intelligent bus agents. These intelligent bus agents eliminate the need to send Kill requests and eliminate the "food fights" associated with retries of losing ownership requests. Since much of the messaging back and forth between the bus agents and the bus arbiter is eliminated by implementation of the illustrative embodiments, store latency in symmetrical multiprocessor systems is reduced. As a result, the performance of the SMP system is improved by lessening the overhead associated with shared cache accesses.

It should be appreciated that while the above illustrative embodiments have been described in terms of a central arbiter, the present invention is not limited to such. Rather, the mechanisms of the illustrative embodiments may be applied to other arbitration architectures include a distributed arbitration architecture such as described in U.S. patent application Ser. No. 11/121,121 and/or Ser. No. 11/120,909. For example, the arbiter may be provided as a single arbitration logic unit in one of the processor nodes of a multiprocessor system, or may be distributed as a plurality of arbitration logic units, each arbitration logic unit being provided in one of the processor nodes of the multiprocessor system. In such embodiments, rather than communication directly with a central arbiter, one or more of the nodes may have arbitration logic for performing the arbitration operations on one or more portions of a shared cache address space. As such, the various messages described above, may be passed from one node to another in a ring fashion, for example, such that the ownership requests, reflected ownership requests, snoop replies, combined responses, data transfers, and the like, are circulated around the ring until they are received by an appropriate node and/or arbitration logic.

It should further be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a multiprocessor system, for controlling access to a portion of data, comprising:

sending a request for ownership of a portion of a shared memory to an arbiter;

receiving a reflected request for ownership from the arbiter;

determining if ownership of the portion of shared memory will be granted by the arbiter based on the received reflected request;

preparing, prior to receiving ownership of the portion of shared memory, to access the portion of shared memory in response to determining that the ownership of the portion of shared memory will be granted by the arbiter; and accessing the portion of shared memory in response to receiving ownership of the portion of shared memory from the arbiter.

2. The method of claim 1, wherein accessing the portion of shared memory comprises:
sending a reply to the reflected request for ownership to the arbiter;
receiving a combined response from the arbiter, the combined response being a combination of all replies to the reflected request for ownership received by the arbiter from all processor nodes in the multiprocessor system; and
accessing the portion of shared memory in response to receiving the combined response.

3. The method of claim 1, wherein the shared memory is a shared cache, and wherein each processor node of the multiprocessor system has a local memory and local cache, a combination of the local caches constituting the shared cache.

4. The method of claim 1, wherein the arbiter is a single centralized arbiter.

5. The method of claim 1, wherein the arbiter is a single arbiter provided in one processor node in the multiprocessor system.

6. The method of claim 1, wherein the arbiter comprises a plurality of arbitration logic units, each arbitration logic unit being provided in a processor node within the multiprocessor system.

7. The method of claim 1, wherein the request for ownership has an associated transaction tag, and wherein determining if ownership of the portion of shared memory will be granted by the arbiter based on the received reflected request comprises determining if a transaction tag provided in the reflected request for ownership matches a transaction tag of the request for ownership.

8. The method of claim 1, wherein the method is performed by a first processing node of the multiprocessor system, and wherein a second request for ownership of the portion of shared memory is received by the arbiter from a second processor node of the multiprocessor system, and in response to the second processor node receiving the reflected request for ownership, the second processor node waits, without retrying the second request for ownership, for reflection of the second request for ownership if the reflected request for ownership does not match the second request for ownership.

9. The method of claim 1, further comprising:
preparing to submit a "request with intent to modify" (RWITM) request to the arbiter once the arbiter reflects the request for ownership, if ownership of the portion of shared memory will not be granted by the arbiter.

10. The method of claim 9, wherein if ownership of the portion of shared memory will not be granted by the arbiter, the request for ownership is not retried prior to sending the RWITM request to the arbiter.

11. The method of claim 9, further comprising:
submitting the RWITM request to the arbiter;
receiving a reflected RWITM request from the arbiter;
replying to the reflected RWITM request by sending a reply to the arbiter;
receiving a combined response from the arbiter;
receiving a data transfer from a processor node having an up to date version of the portion of shared memory; and
modifying a state of the portion of shared memory in response to receiving the data transfer.

12. The method of claim 1, wherein, if the arbiter grants ownership of the portion of shared memory, a Kill request is not sent to remove the validity of the portion of shared memory in other processor nodes of the multiprocessor system.

13. A computer program product comprising a computer useable medium having a computer readable program, wherein the computer readable program, when executed on a computing device, causes the computing device to:
send a request for ownership of a portion of a shared memory to an arbiter;
receive a reflected request for ownership from the arbiter;
determine if ownership of the portion of shared memory will be granted by the arbiter based on the received reflected request;
prepare, prior to receiving ownership of the portion of shared memory, to access the portion of shared memory in response to determining that the ownership of the portion of shared memory will be granted by the arbiter; and
access the portion of shared memory in response to receiving ownership of the portion of shared memory from the arbiter.

14. The computer program product of claim 13, wherein the computer readable program causes the computing device to access the portion of shared memory by:
sending a reply to the reflected request for ownership to the arbiter;
receiving a combined response from the arbiter, the combined response being a combination of all replies to the reflected request for ownership received by the arbiter from all processor nodes in the multiprocessor system; and
accessing the portion of shared memory in response to receiving the combined response.

15. The computer program product of claim 13, wherein the shared memory is a shared cache, and wherein each processor node of the multiprocessor system has a local memory and local cache, a combination of the local caches constituting the shared cache.

16. The computer program product of claim 13, wherein the arbiter is a single centralized arbiter.

17. The computer program product of claim 13, wherein the arbiter is a single arbiter provided in one processor node in the multiprocessor system.

18. The computer program product of claim 13, wherein the arbiter comprises a plurality of arbitration logic units, each arbitration logic unit being provided in a processor node within the multiprocessor system.

19. The computer program product of claim 13, wherein the request for ownership has an associated transaction tag, and wherein the computer readable program causes the computing device to determine if ownership of the portion of shared memory will be granted by the arbiter based on the received reflected request by determining if a transaction tag provided in the reflected request for ownership matches a transaction tag of the request for ownership.

20. The computer program product of claim 13, wherein the computing device is a first processing node of the multiprocessor system, and wherein a second request for ownership of the portion of shared memory is received by the arbiter from a second processor node of the multiprocessor system, and in response to the second processor node receiving the reflected request for ownership, the second processor node waits, without retrying the second request for ownership, for reflection of the second request for ownership if the reflected request for ownership does not match the second request for ownership.

21. The computer program product of claim 13, wherein the computer readable program further causes the computing device to:
prepare to submit a "request with intent to modify" (RWITM) request to the arbiter once the arbiter reflects the request for ownership, if ownership of the portion of shared memory will not be granted by the arbiter.

22. The computer program product of claim 21, wherein if ownership of the portion of shared memory will not be granted by the arbiter, the request for ownership is not retried prior to sending the RWITM request to the arbiter.

23. The computer program product of claim 21, wherein the computer readable program further causes the computing device to:
submit the RWITM request to the arbiter;
receive a reflected RWITM request from the arbiter;
reply to the reflected RWITM request by sending a reply to the arbiter;
receive a combined response from the arbiter;
receive a data transfer from a processor node having an up to date version of the portion of shared memory; and
modify a state of the portion of shared memory in response to receiving the data transfer.

24. The computer program product of claim 13, wherein, if the arbiter grants ownership of the portion of shared memory, a Kill request is not sent to remove the validity of the portion of shared memory in other processor nodes of the multiprocessor system.

25. A system, comprising:
a plurality of processor nodes; and
an arbiter coupled to the plurality of processor nodes, wherein a first processor node in the plurality of processor nodes:
sends a request for ownership of a portion of a shared memory to the arbiter;
receives a reflected request for ownership from the arbiter;
determines if ownership of the portion of shared memory will be granted by the arbiter based on the received reflected request;
prepares, prior to receiving ownership of the portion of shared memory, to access the portion of shared memory in response to determining that the ownership of the portion of shared memory will be granted by the arbiter; and
accesses the portion of shared memory in response to receiving ownership of the portion of shared memory from the arbiter.

26. The system of claim 25, wherein the first processor node accesses the portion of shared memory by:
sending a reply to the reflected request for ownership to the arbiter;
receiving a combined response from the arbiter, the combined response being a combination of all replies to the reflected request for ownership received by the arbiter from all of the processor nodes in the plurality of processor nodes; and
accessing the portion of shared memory in response to receiving the combined response.

27. The system of claim 25, wherein the shared memory is a shared cache, and wherein each processor node in the plurality of processor nodes has a local memory and local cache, a combination of the local caches constituting the shared cache.

28. The system of claim 25, wherein the arbiter is a single centralized arbiter.

29. The system of claim 25, wherein the arbiter is a single arbiter provided in one processor node in the plurality of processor nodes.

30. The system of claim 25, wherein the arbiter comprises a plurality of arbitration logic units, each arbitration logic unit being provided in a processor node within the plurality of processor nodes.

31. The system of claim 25, wherein the request for ownership has an associated transaction tag, and wherein the first processor node determines if ownership of the portion of shared memory will be granted by the arbiter based on the received reflected request by determining if a transaction tag provided in the reflected request for ownership matches a transaction tag of the request for ownership.

32. The system of claim 25, wherein a second request for ownership of the portion of shared memory is received by the arbiter from a second processor node of the plurality of processor nodes, and in response to the second processor node receiving the reflected request for ownership, the second processor node waits, without retrying the second request for ownership, for reflection of the second request for ownership if the reflected request for ownership does not match the second request for ownership.

33. The system of claim 25, wherein the first processor node prepares to submit a "request with intent to modify" (RWITM) request to the arbiter once the arbiter reflects the request for ownership, if ownership of the portion of shared memory will not be granted by the arbiter.

34. The system of claim 33, wherein if ownership of the portion of shared memory will not be granted by the arbiter, the request for ownership is not retried prior to sending the RWITM request to the arbiter.

35. The system of claim 25, wherein, if the arbiter grants ownership of the portion of shared memory, a Kill request is not sent to remove the validity of the portion of shared memory in other processor nodes of the multiprocessor system.

* * * * *